(12) United States Patent
Rossato et al.

(10) Patent No.: US 9,300,980 B2
(45) Date of Patent: Mar. 29, 2016

(54) UPSAMPLING AND DOWNSAMPLING OF MOTION MAPS AND OTHER AUXILIARY MAPS IN A TIERED SIGNAL QUALITY HIERARCHY

(76) Inventors: Luca Rossato, Milan (IT); Guido Meardi, Milan (IT)

( * ) Notice: Subject to any disclaimer, the term of this patent is extended or adjusted under 35 U.S.C. 154(b) by 1024 days.

(21) Appl. No.: 13/303,554

(22) Filed: Nov. 23, 2011

(65) Prior Publication Data
US 2013/0294514 A1 Nov. 7, 2013

Related U.S. Application Data

(60) Provisional application No. 61/558,302, filed on Nov. 10, 2011.

(51) Int. Cl.
| | |
|---|---|
| *H04N 19/59* | (2014.01) |
| *H04N 19/31* | (2014.01) |
| *H04N 19/523* | (2014.01) |
| *H04N 19/192* | (2014.01) |
| *H04N 19/187* | (2014.01) |
| *H04N 19/30* | (2014.01) |
| *H04N 19/53* | (2014.01) |
| *H04N 19/136* | (2014.01) |
| *H04N 19/33* | (2014.01) |
| *H04N 19/513* | (2014.01) |
| *H04N 19/139* | (2014.01) |
| *G06T 7/20* | (2006.01) |

(52) U.S. Cl.
CPC ............. *H04N 19/59* (2014.11); *H04N 19/136* (2014.11); *H04N 19/139* (2014.11); *H04N 19/187* (2014.11); *H04N 19/192* (2014.11); *H04N 19/30* (2014.11); *H04N 19/31* (2014.11); *H04N 19/33* (2014.11); *H04N 19/513* (2014.11); *H04N 19/523* (2014.11); *H04N 19/53* (2014.11); *G06T 7/2073* (2013.01)

(58) Field of Classification Search
CPC ...................................................... H04N 19/59
See application file for complete search history.

(56) References Cited

U.S. PATENT DOCUMENTS

| | | | | |
|---|---|---|---|---|
| 5,477,272 A * | 12/1995 | Zhang | ..................... | G06T 7/202 348/699 |
| 5,612,735 A * | 3/1997 | Haskell et al. | ................... | 348/43 |
| 2002/0196854 A1* | 12/2002 | Kim | ....................... | H04N 19/59 375/240.17 |
| 2003/0068090 A1* | 4/2003 | Akiyoshi | ............... | H04N 19/51 382/240 |
| 2005/0232514 A1 | 10/2005 | Chen | | |

(Continued)

FOREIGN PATENT DOCUMENTS

WO    WO 2008115222 A1 *  9/2008    ............. H04N 13/00

OTHER PUBLICATIONS

Y.F. Ma & H.J. Zhang, "Motion Texture: A New Motion Based Video Representation", 2 Proceedings of the 16th Int'l Conf. on Pattern Recognition 548-551 (2002).*

(Continued)

*Primary Examiner* — David N Werner
(74) *Attorney, Agent, or Firm* — Chapin IP Law, LLC

(57) ABSTRACT

Certain configurations herein include changing the resolution of an auxiliary map (e.g., a motion map, a z-map, etc.) at a first level of quality to obtain an auxiliary map at a second level of quality. For example, changing the resolution can include receiving a respective auxiliary map of one or more vectors at one or more lower levels of quality and progressively refining, via novel operations, the auxiliary map to higher or lower levels of quality in a hierarchy.

32 Claims, 22 Drawing Sheets

(56) References Cited

U.S. PATENT DOCUMENTS

| | | | |
|---|---|---|---|
| 2006/0088101 A1 | 4/2006 | Han et al. | |
| 2006/0126952 A1* | 6/2006 | Suzuki | G06T 5/002 382/233 |
| 2006/0160303 A1* | 7/2006 | Ang et al. | 438/257 |
| 2007/0121728 A1* | 5/2007 | Wang | H04N 19/563 375/240.18 |
| 2008/0111923 A1* | 5/2008 | Scheuermann | H04N 19/61 348/607 |
| 2008/0117974 A1* | 5/2008 | Ramachandran | H04N 19/176 375/240.16 |
| 2009/0092189 A1* | 4/2009 | Tsuchiya | H04N 19/51 375/240.16 |
| 2009/0103621 A1* | 4/2009 | Numata | G06T 7/2013 375/240.16 |
| 2010/0182511 A1* | 7/2010 | Xu | 348/699 |
| 2011/0081093 A1* | 4/2011 | Racape et al. | 382/233 |
| 2011/0170615 A1* | 7/2011 | Vo et al. | 375/240.26 |

OTHER PUBLICATIONS

A. Thyssen, "ImageMagick v6 Examples—Resize or Scaling", Online, Archived version as of Oct. 11, 2010.*

WIPO, International Preliminary Report on Patentability for PCT/IB2012/002286 (May 13, 2014).*

H. Takeda, S. Farsiu, & P. Milanfar, "Kernel Regression for Image Processing and Reconstruction", 16 IEEE Transactions on Image Processing 349-366 (Feb. 2007).*

Li, Min et al., "Inter-Layer Motion Vector Interpolation for Low-Complexity and Very Low Bitrate Scalable Video Coding", 2007, Total pp. 4, IEEE, New York.

Dane et al., "Smooth Motion Vector Resampling for Standard Compatible Video Post-Processing", 2004, Total pp. 5, IEEE, New York.

International Search Report from corresponding PCT application No. PCT/IB2012/002286, mailed Feb. 20, 2013, Total pp. 3.

* cited by examiner

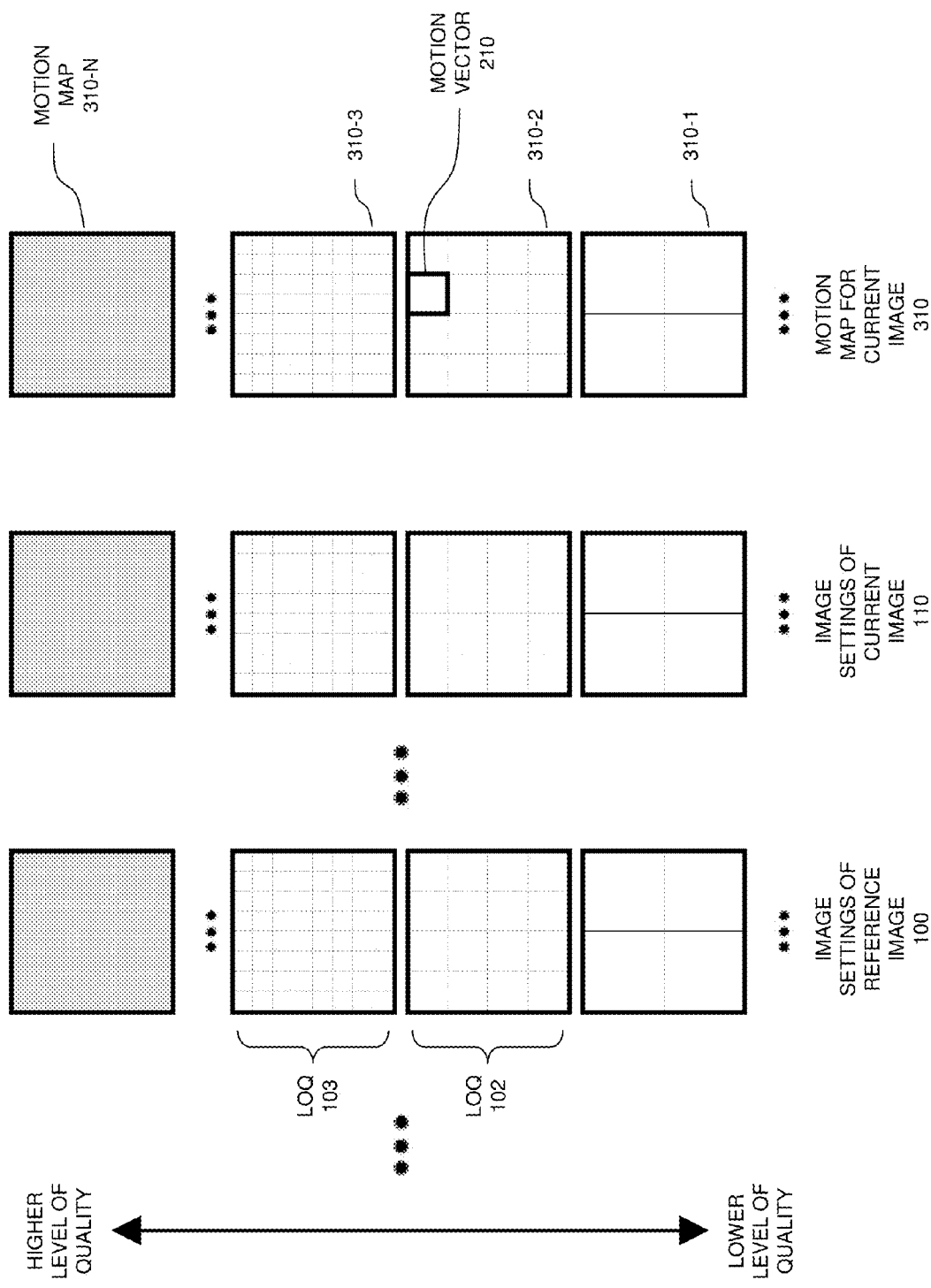

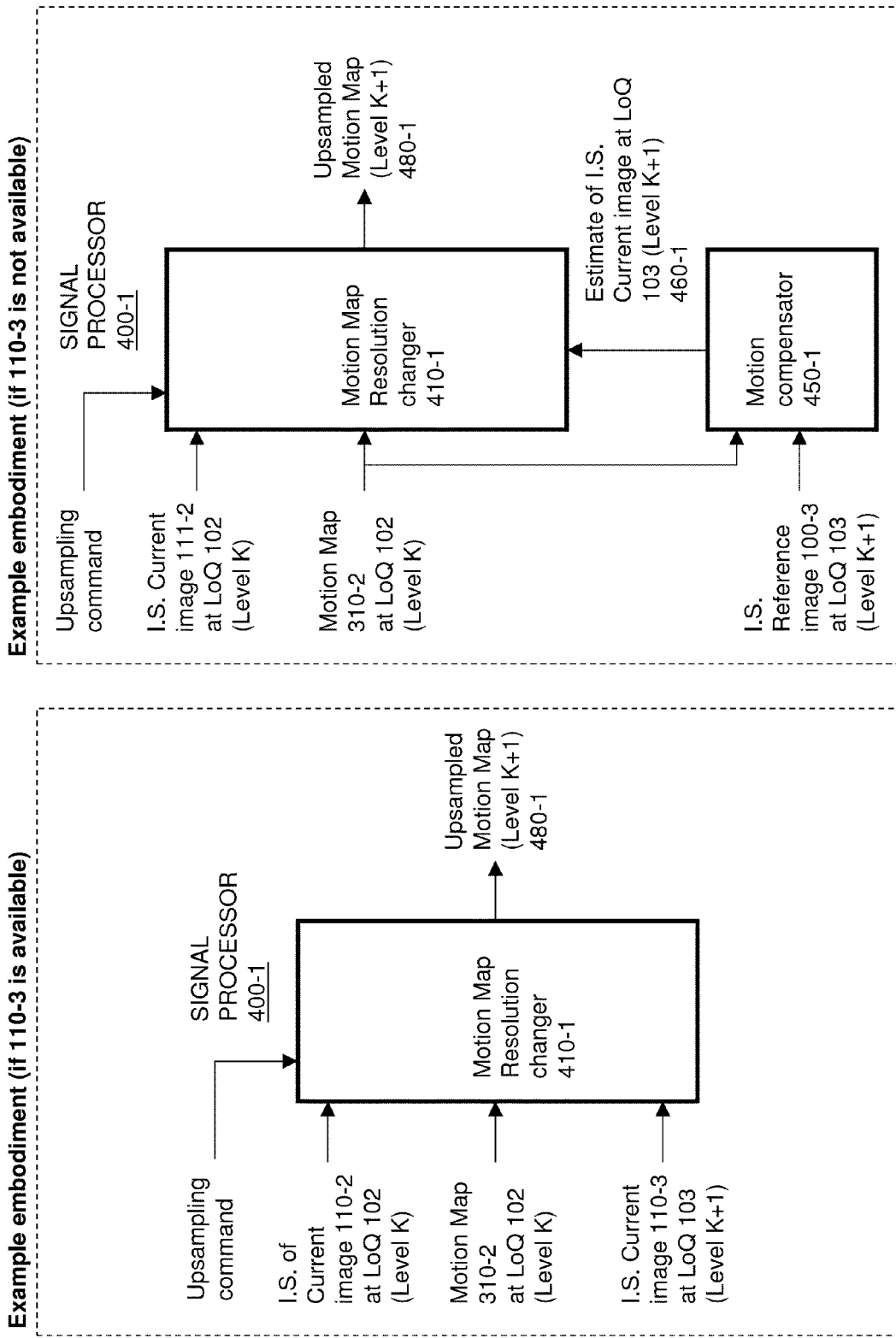

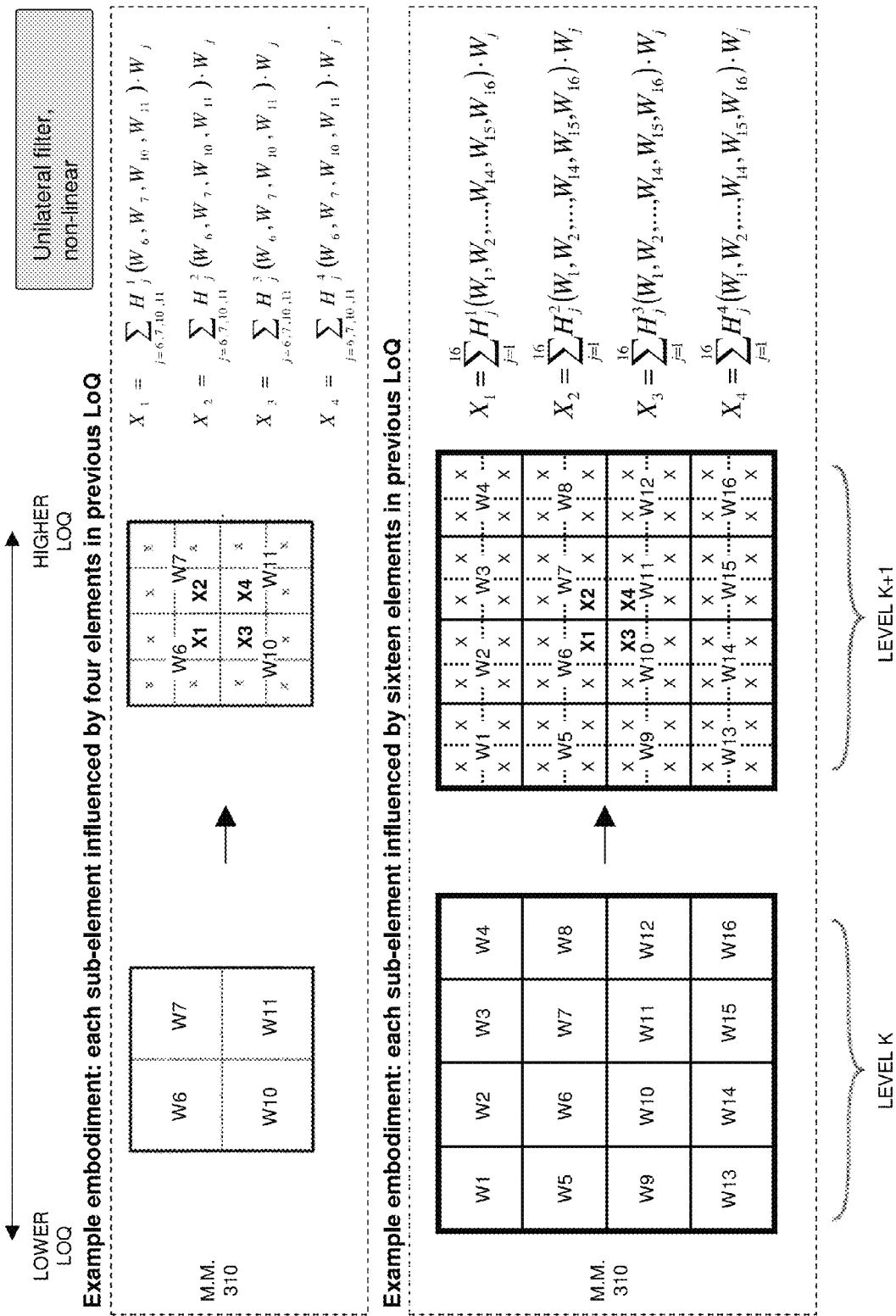

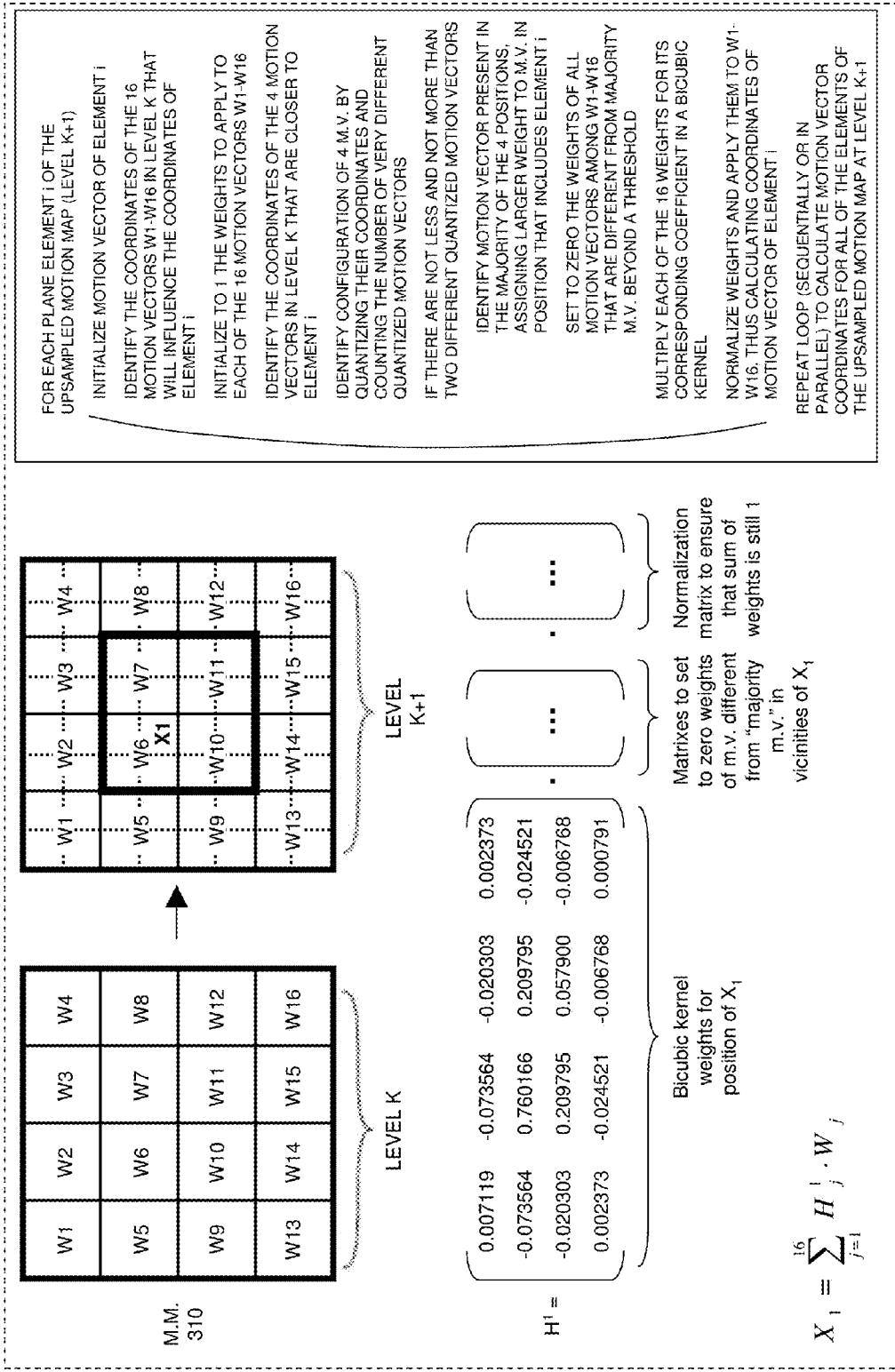
Figure 5C — Example embodiment of unilateral non-linear filter: majority-based modification of bicubic kernel weights

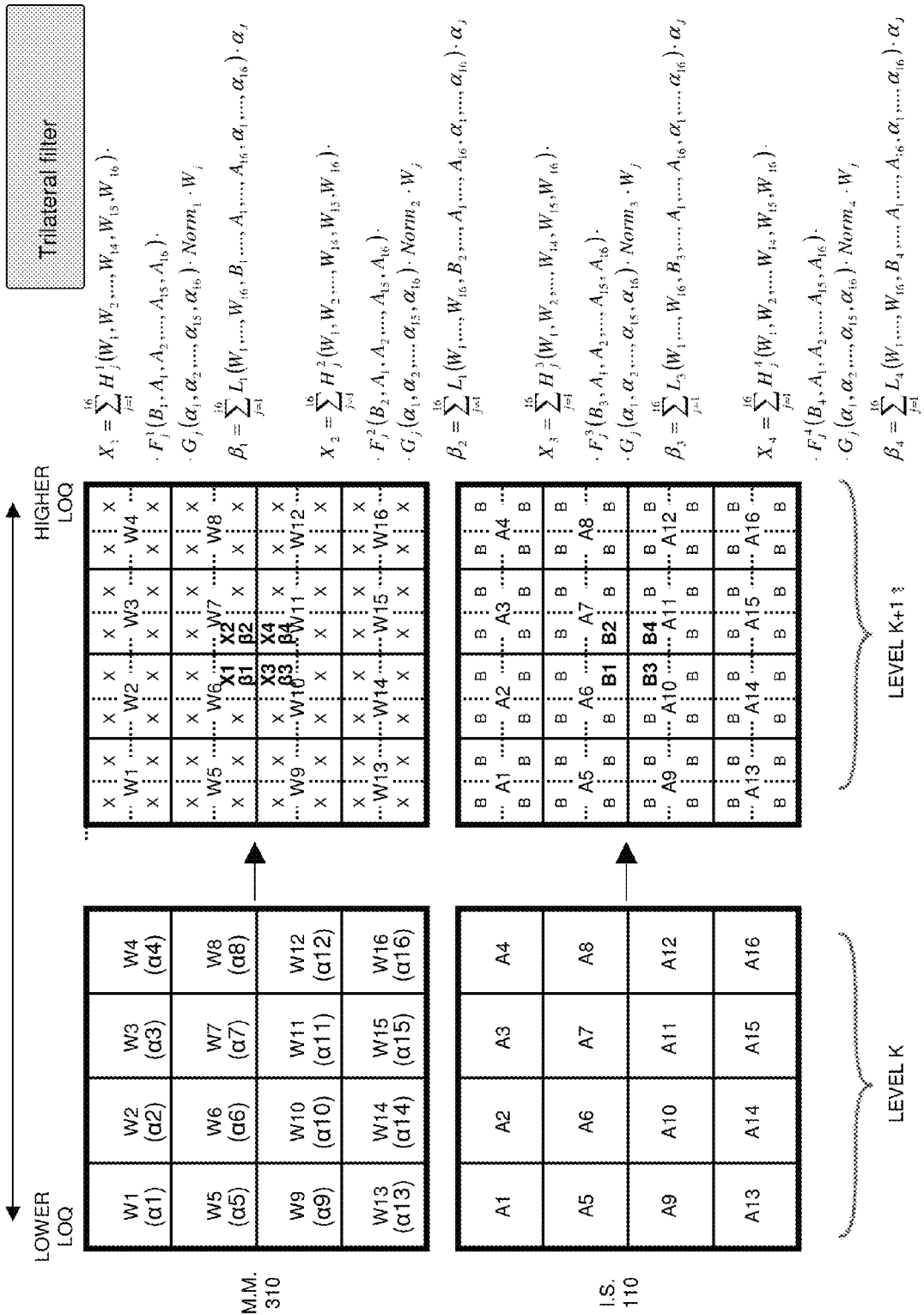

Figure 9

FOR EACH PLANE ELEMENT i OF THE UPSAMPLED MOTION MAP (LEVEL K+1)

INITIALIZE MOTION VECTOR COORDINATES AND METADATA FOR ELEMENT i

IDENTIFY THE COORDINATES W AND THE METADATA α OF THE MOTION VECTORS Z IN LEVEL K THAT WILL INFLUENCE THE COORDINATES OF ELEMENT i

IDENTIFY COLOR SETTINGS OF THE ELEMENTS IN LEVEL K THAT CORRESPOND TO THE MOTION VECTORS Z THAT WILL INFLUENCE THE COORDINATES OF ELEMENT i

IF IMAGE SETTINGS FOR LEVEL K+1 OF CURRENT IMAGE ARE AVAILABLE

SET ESTIMATED COLOR SETTINGS OF i AS THE COLOR SETTINGS OF ELEMENT i IN LEVEL K+1 OF CURRENT IMAGE

ELSE

MOTION COMPENSATE REFERENCE IMAGE AT LEVEL K+1 LEVERAGING MOTION MAP AT LEVEL K

SET ESTIMATED COLOR SETTINGS OF i AS COLOR SETTINGS OF ELEMENT i IN MOTOCOMPENSATED REFERENCE IMAGE AT LEVEL K+1

BASED ON POSITION OF i (AND POTENTIALLY ALSO ON MOTION VECTORS Z), CALCULATE WEIGHTS H TO APPLY TO COORDINATES W OF MOTION VECTORS Z

BASED ON ESTIMATED COLOR SETTINGS OF ELEMENT i WITH RESPECT TO COLOR SETTINGS OF ELEMENTS THAT CORRESPOND TO MOTION VECTORS W, CALCULATE WEIGHTS F TO APPLY TO COORDINATES W OF MOTION VECTORS Z

BASED ON METADATA α OF MOTION VECTORS Z, CALCULATE WEIGHTS G TO APPLY TO COORDINATES W OF MOTION VECTORS Z

BASED ON WEIGHTS H, F AND G, CALCULATE NORMALIZED WEIGHTS R TO APPLY TO COORDINATES W OF MOTION VECTORS Z

SET COORDINATES OF ELEMENT i AS THE RESULT OF THE APPLICATION OF WEIGHTS R TO COORDINATES W OF MOTION VECTORS Z

BASED ON WEIGHTS H, F AND G, CALCULATE WEIGHTS L TO APPLY TO METADATA α OF MOTION VECTORS Z

SET METADATA OF ELEMENT i AS THE RESULT OF THE APPLICATION OF WEIGHTS L TO PRECISION LEVELS α OF MOTION VECTORS Z

REPEAT LOOP 1 (SEQUENTIALLY OR IN PARALLEL) TO CALCULATE MOTION VECTOR COORDINATES AND METADATA FOR ALL OF THE ELEMENTS OF THE UPSAMPLED MOTION MAP AT LEVEL K+1

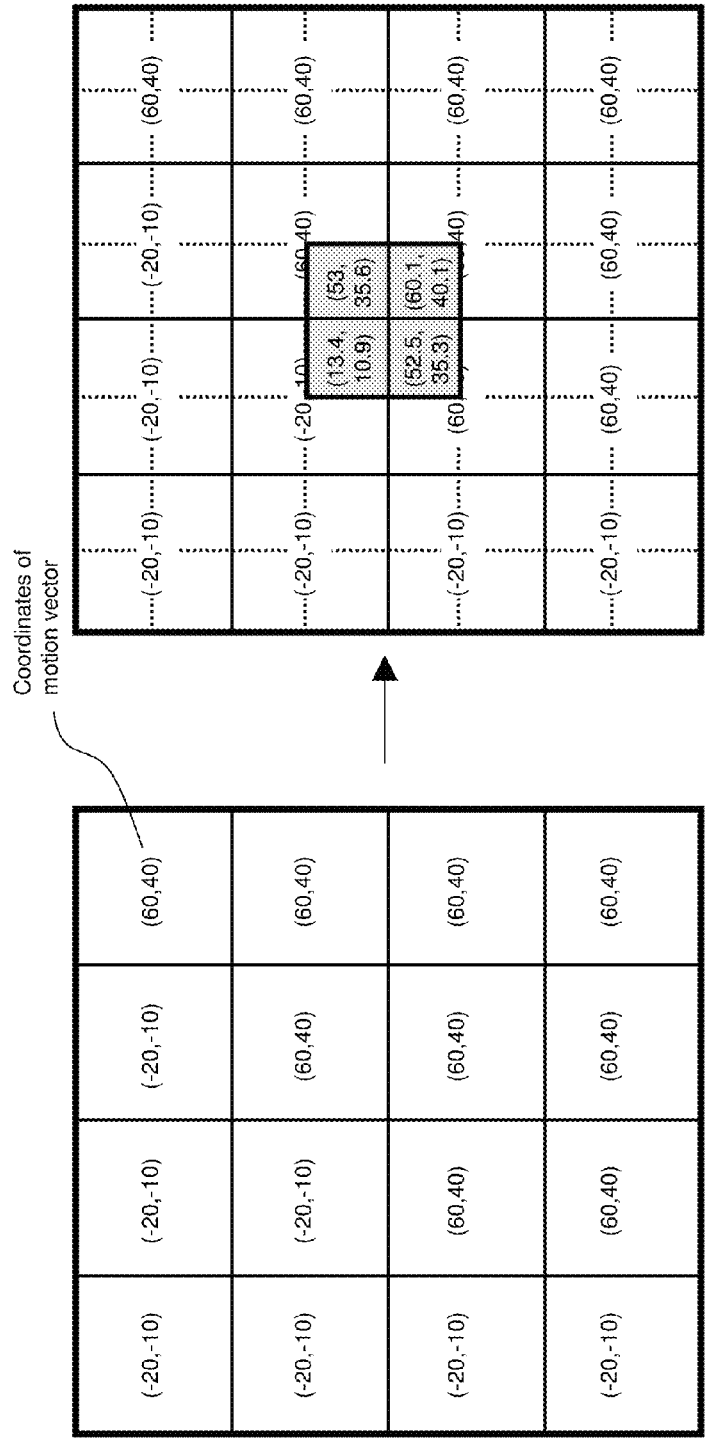

Example embodiment – Use of Motion Map upsampling during Motion Estimation

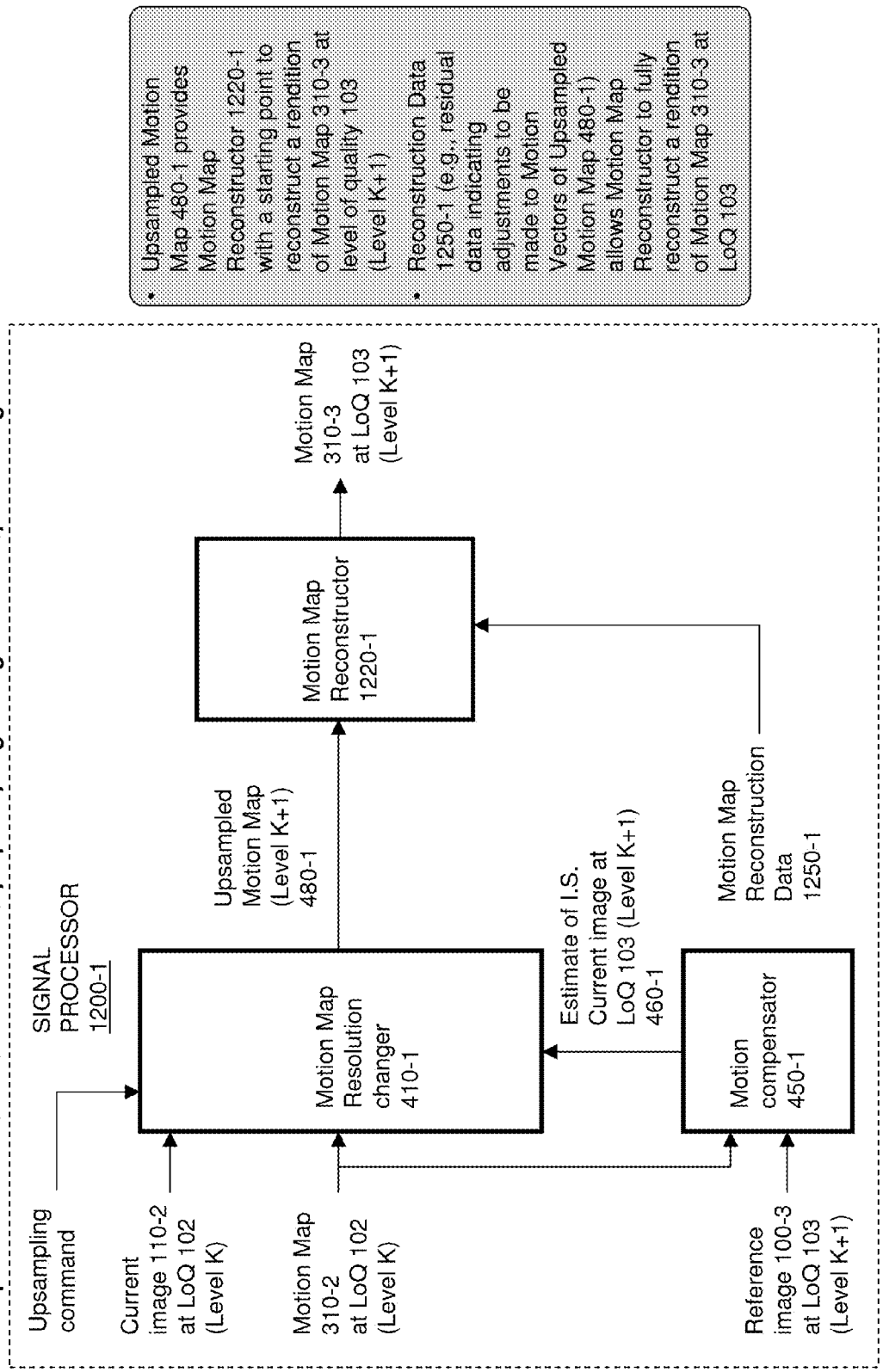

Example embodiment: bilateral downsampling with bilinear kernel H

UPSAMPLING AND DOWNSAMPLING OF MOTION MAPS AND OTHER AUXILIARY MAPS IN A TIERED SIGNAL QUALITY HIERARCHY

RELATED APPLICATIONS

This application is related to and claims the benefit of U.S. Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY," filed on Nov. 10, 2011, the entire teachings of which are incorporated herein by this reference.

This application is also related to U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference.

This application is related to U.S. patent application Ser. No. 13/188,201 entitled "TIERED SIGNAL DECODING AND SIGNAL RECONSTRUCTION," filed on Jul. 21, 2011, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY," filed on Jul. 21, 2011, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on Jul. 21, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY," filed on Jul. 21, 2011, the entire teachings of which are incorporated herein by this reference.

BACKGROUND

Motion estimation is the process of determining motion vectors that describe the transformation from one picture to another, usually from adjacent frames in a video sequence. Motion estimation is typically based on an assumption that image values (brightness, color, etc., expressed in a suitable color space) remain constant over time, though their position in the image may change.

In MPEG, The motion vectors may relate to the whole image (global motion estimation) or specific parts, such as rectangular blocks, arbitrary shaped patches or even per each element of the image. The map of all motion vectors ("motion map") can thus possess a different resolution from the image/frames to which it refers. In case motion estimation calculated a motion vector per each element of the image (e.g., per each pixel of the frame of a video), the motion map ("accurate" or "dense" motion map) will have the same resolution as the image to which it refers.

Motion maps are helpful for a variety of applications.

First, they can notably improve the compression rate of video encoding, since they allow to produce a rendition of a frame based on a previous reference frame already known to the decoder ("motion compensation"), avoiding the need to transmit again the information that can be reused from previous frames: the decoder can generate settings for the given element in the current frame based on settings of the element in the reference frame to which the motion vector points. In fact, basic motion estimation and motion compensation techniques have been employed in conventional video codecs (e.g., MPEG family codecs or other frequency-transform based/block-based codecs) in order to account for movement of an object in a moving picture of multiple sequential frames. For example, using block motion compensation (BMC), the frames can be partitioned into blocks of pixels. Each block B in the current frame can be predicted based on a block $B_0$ of equal size in a reference frame. The position of the block $B_0$ in the reference frame with respect to the position of B in the current frame can be encoded as a motion vector. In such cases, the motion vector indicates the opposite of the estimated x and y movement of the block of pixels (in particular, it indicates the opposite of the movement since it points from B to $B_0$, while the movement is from $B_0$ to B). The motion vector is typically encoded with sub pixel precision (i.e., can specify movements also of fractions of a pixel) because the encoder wants to be able to capture also subtle movements of less than a full pixel. According to MPEG family codecs, the blocks are not transformed other than being shifted to the position of the predicted block, and additional encoded information can indicate differences between block $B_0$ and block B.

In addition to video encoding, there are also many other applications that can benefit from motion estimation, ranging from robotics (a dense motion field can help estimate the z-order of an image, i.e. a z-map associated with the image and making sense of depth) to professional movie post-production/visual effects.

Estimating accurate/dense motion maps is very complex, so conventional motion estimation techniques rely either on block matching (a small region of the current frame is compared with similar sized regions in the reference frame, typically oversampled in order to allow for sub pixel motion estimation, until a vector that minimizes some error criterion is chosen) or on optical flow methods (the image is preprocessed so as to extract a few hundreds of features, then the algorithm tries to identify the precise motion of the features and calculates a dense motion map through interpolation).

Motion maps are just specific examples of what we defined "auxiliary maps", i.e. maps of auxiliary information that is associated to a signal (which can be a 2D image, a 3D volumetric image, a 3D signal including both space and time-based dimensions, or even a signal featuring more than three dimensions) in a way that for given portions of the signal (e.g., in the case of dense auxiliary maps, for every plane element of the signal) the auxiliary map specifies suitable information and/or meta-information associated with that portion/element. In the case of motion maps, such auxiliary information is represented by the coordinates of the motion vector and by additional meta-information related to the motion vector.

Aside from motion maps, other non-limiting examples of auxiliary maps are z-maps (which provide, for every portion/element of the signal, information relative to the depth of field/distance from the observer), simplified motion fields (which provide simplified information on the motion of every portion/element of the signal, e.g. highly quantized motion information suitable to distinguish between what moves with a motion within a given range of movements vs. what is still or moves with a movement outside of the range), class maps (which provide, for every portion/element of the signal, information relative to what class it belongs to, e.g., distinguishing in medical imaging between plane elements belonging to bones, soft tissues, fluids, metals, etc.), and so forth.

One of the key characteristics of auxiliary maps is that they present fairly homogenous areas separated by sharp discontinuities, and it is often inappropriate to modify their resolution (e.g., obtaining a more accurate map starting from a lower resolution one, or vice versa) by leveraging interpolation techniques or other standard upsampling/downsampling techniques. For instance, in a video it would be inappropriate to define the motion of an element at the transition between two motion zones moving in different ways by means of a motion vector calculated by interpolating the two different motions, since the interpolation would likely lead to a movement that has nothing to do with either of the two movements. In a similar fashion, in a medical image it would be inappropriate to define the value of an element at the transition between a bone and a soft tissue by means of interpolating the two corresponding classes, since the interpolated class would likely have no meaning in that context.

BRIEF DESCRIPTION OF EMBODIMENTS

No conventional approaches are available in order to intelligently modify the resolution/level of accuracy of an auxiliary map (i.e., both upsampling or downsampling) by taking into account both the distinctive topological characteristics of auxiliary maps (e.g., the presence of fairly homogeneous areas with very sharp transitions among one another) as well as additional information and meta-data that can be available (e.g., the corresponding image to which the auxiliary map refers, and/or meta-data relative to the contents of the auxiliary map).

Embodiments herein deviate with respect to conventional systems and methods, providing new methods to modify the resolution and the level of accuracy of auxiliary maps.

For simplicity, embodiments illustrated herein refer to 2D auxiliary maps, and in particular to 2D motion maps (e.g., fields of two-dimensional motion vectors, with each vector providing an offset from the coordinates in the current 2D image to the coordinates in a reference 2D image), but the same concepts also apply for any other types of multi-dimensional auxiliary maps containing auxiliary information (e.g., in the form of auxiliary vectors—i.e., arrays of auxiliary values associated with each element of the auxiliary map—and/or meta-information related to auxiliary vectors). By ways of non-limiting examples, other types of auxiliary information include fields of z-order information indicating depth, fields of three-dimensional motion vectors each providing an offset from the coordinates in the current volumetric image to the coordinates in a reference volumetric image, etc. The same approaches illustrated herein for motion maps are applicable to other types of auxiliary maps by simply substituting "motion vector" with "auxiliary vector".

Also, in the non-limiting example embodiments illustrated herein scale factors of 2 are typically applied between any two different levels of quality, but the same concepts apply for any scale factor, including non-integer scale factors.

The signals to which auxiliary maps are associated can represent pictures/frames of a video (encoded in a suitable color space, such as RGB, YUV, HSV, etc.), other multi-dimensional time-based signals (e.g., in which one of the dimensions represents time) or other types of signals (e.g., volumetric imaging, holographic imaging, plenoptic/light-field imaging, medical imaging, scientific imaging, thermal maps, etc.).

In motion maps, motion vectors coordinates can be represented with any suitable coordinate system (e.g., Cartesian systems, polar coordinate systems, etc.). This deviates from conventional systems and methods, which always use Cartesian coordinate systems for motion maps.

Embodiments herein include producing auxiliary maps such as motion maps at multiple levels of quality in a hierarchy.

In order to generate respective motion vectors for the sub-elements of each motion vector at a first level of quality, in addition to using motion vectors at the first level of quality and their respective meta-data, embodiments herein can include identifying and using color transition information of the images (e.g., either reference image or, if available, current image) at a second level of quality in order to determine values for motion vectors at the second level of quality. For example, one embodiment herein includes identifying color information for sub-elements in the reference image at the second level of quality based on at least one motion vector associated with the selected element at the first level of quality and utilizing the color information to generate respective motion vectors for the sub-elements, values of the respective motion vectors being calculated also based on color transitions as indicated by the color information. Thus, by ways of non-limiting example the respective motion vectors can follow color transitions as indicated by the color information.

Changing the resolution of a motion map at a first level of quality to obtain a motion map at a second level of quality is useful in many ways. For example, one embodiment herein includes receiving a respective motion map of one or more vectors at one or more lower levels of quality and progressively refining, via novel upsampling operations, the motion map to higher levels of quality (e.g., to a higher resolution) up a hierarchy. The resolution of the motion map changes as the motion map is produced at the higher levels of quality.

In one embodiment, a signal processor receives and reconstructs a motion map. The motion map defines a relationship between elements in a current image with respect to elements a reference image. For example, the motion map can be encoded to identify the relationship and indicate movement of objects from one frame to the next.

Each of the images in a sequence can be encoded at multiple different levels of quality in a hierarchy. To upsample a respective motion map for a current image from a lower level of quality in the hierarchy, the signal processor selects a given element from the motion map at a first level of quality. The signal processor subdivides the given element in the motion map at the first level of quality to create multiple sub-elements of a motion map at a second (e.g., next higher) level of quality in the hierarchy. Settings derived for the sub-divided elements in the motion maps at the next higher level of quality can be derived based on settings of multiple neighboring elements or nearby elements in a vicinity of the element being subdivided and upsampled to the next higher level of quality.

As discussed herein, based at least in part on motion vectors and/or other information such as meta-information of motion vectors (e.g., by way of non-limiting example, parameters indicating the precision of each motion vector, parameters indicating the covariance information of each motion vector, etc.) and/or color transition information (e.g., by way of non-limiting example, color setting information in a color space such as YUV, RGB, HSV, etc.) assigned to multiple elements in the current frame or in the reference frame at the first or other level of quality, the signal processor can produce a respective motion vector for each of the sub-elements for the motion map at the second level of quality.

In one embodiment, the signal processor can receive additional information (e.g., in the form of reconstruction data for the images) that allows to refine selected elements (i.e., modify selected motion vectors) of the motion map at the second level of quality.

Via repeating this process of converting a motion map to the next higher level of quality, the signal processor can recreate one or more motion maps at yet higher and higher levels of quality for the current image to which the motion map pertains.

In one embodiment, the motion map for an image at the higher level of quality is a dense motion map facilitating reconstruction of a corresponding signal such as an image.

Each frame in a sequence of video frames can be encoded to include a hierarchy of motion maps.

Accordingly, embodiments herein deviate with respect to conventional systems and methods. For example, one embodiment herein includes producing a respective motion map of one or more vectors at one or more lower levels of quality and progressively refining, via novel upsampling operations, the motion map to higher levels of quality up a hierarchy.

In one embodiment, the respective motion vectors in the motion map (i.e., auxiliary map) generated for each respective sub-element at the second level of quality for the current frame can indicate a corresponding element in the second level of quality of the reference frame to which the respective sub-element pertains. For example, the motion vector for a given sub-element in the current frame can indicate the location of a respective element in the reference frame. The motion vector for the given sub-element indicates an amount, in a field of multiple elements, in which an object or other resource as represented by the given sub-element moved from a location in the reference frame to the a location in the current frame. Thus, the respective motion vector generated for a respective sub-element of the multiple sub-elements at the second level of quality of the current frame can indicate movement, in a field, of an object as represented by a corresponding element in the reference frame to a location of the respective sub-element in the current frame.

Thus, in accordance with further more specific embodiments, via use of a respective motion vector, a signal processor can be configured to utilize a display setting of the corresponding element in the reference frame to which the respective sub-element in the current signal frame pertains at least in part to identify a display setting for the respective sub-element at the second level of quality in the current frame.

Note that, according to one embodiment, a resolution of the motion vectors can be of sufficiently high resolution such that a corresponding motion vector can indicate fractional movements of an element from an element (e.g., first location) in the reference frame to an element (e.g., new location) in the current frame at a given level of quality. In other words, the resolution of the motion vector can be a higher resolution than a resolution of a respective motion map at a corresponding level of quality.

These and other embodiment variations are discussed in more detail below.

As mentioned above, note that embodiments herein can include a configuration of one or more computerized devices, routers, network, workstations, handheld or laptop computers, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: selecting an element from a rendition of the auxiliary map at the first level of quality; subdividing the selected element at the first level of quality into multiple sub-elements, the multiple sub-elements being at the second level of quality in the hierarchy for the auxiliary map, the second level of quality higher than the first level of quality; and based at least in part on auxiliary information assigned to at least one element in the auxiliary map at the first level of quality, generating respective auxiliary information for each of the sub-elements at the second level of quality of the auxiliary map.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce motion vectors, motion maps, auxiliary maps, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

As used herein, the term "pel" refers to a plane element; in 2-D, images are equivalent to pixels. Accordingly, a pixel is a type of pel.

The motion map upsampling techniques as discussed herein can be used both at the encoder (e.g., as one of the steps to produce a dense motion map) and at the decoder (e.g., as one of the steps to decode a dense motion map transmitted by the encoder leveraging the tier-based processing algorithm).

In one embodiment, the encoder also leverages motion map downsampling, which is easily derived from the motion map upsampling methodology, leveraging the same principles (it is basically an upsampling where the scale factor is lower than 1).

The upsampling methodology aims at calculating each motion vector $X_i$, of the upsampled motion map at the next level of quality. The core concepts/innovations as discussed herein can include one or more of the following techniques:

Creating a hierarchy of motion maps, each of which is a functional motion map. This means that the lower quality motion map was a motion map for its respective lower quality current image, and the higher quality motion map is a motion map for its respective higher quality current image.

Processing herein does not necessarily consider the coordinates of motion vectors $W_j$ in the low resolution map that are around each new high resolution motion vector to calculate $X_i$ (which would imply a classic filter, either linear or non linear, i.e. a matrix of weight coefficients to apply to motion vectors $W_j$), but embodiments herein include leveraging three distinct sets of information:

Coordinates of motion vectors, expressed in any suitable coordinate system (Cartesian, polar coordinate system, etc.)

Motion vector precision information (non-limiting example of "motion vector metadata"; further types of metadata can refer to the calculations that were necessary to obtain the motion vector, etc.), for instance expressed in the form of covariance (lexicon warning: precision is high when covariance is low; mathematically, when covariance is a number, precision is generally calculated as the inverse of covariance; when covariance is a matrix, precision may be for instance calculated as the inverse of the trace of the covariance matrix). Motion vector covariance information (or precision information) communicates how confident we are that a given motion vector was calculated correctly: a high covariance (i.e., low precision) indicates that the identified motion vector had a bunch of motion vectors around it, possibly also quite different from it, that were roughly as suitable for that pel as it was; a low covariance (i.e., high precision) indicates that the identified motion vector was correct, and very few others around it (and very similar to it) were similarly suitable for that pel. When upsampling, if several motion vectors are for sure right/precise and some others are probably wrong, it is appropriate to give a higher weight to the ones that are right. As for the way in which covariance/confidence information is encoded, an embodiment/example of motion vector covariance information stores for every vector a covariance matrix (in fact only some of its coefficients, since it's a symmetrical matrix) describing the covariance of the vector; another example would be to just have a mono-dimensional value (e.g., trace of the covariance matrix, etc.).

Color settings information of the image to which the motion map refers, for instance expressed in the form of a weighted average of the settings of each color component of the pel (e.g., by way of non limiting example in YUV color space, YColor=a·Y+b·U+c·V, where a, b and c are three suitable weight parameters). This is done because the sharp transitions of motion vectors usually follow the color transitions of objects, so by looking at color settings information at the higher level of quality we can get useful hints ("border snapping"). The best picture to look at would be the current image, but unfortunately not always is it available: in particular, it is available at an encoder, but a decoder doesn't have it available yet, since it might be upsampling the motion map precisely because it needs to reconstruct the current image at the higher level of quality. In case the current image at the higher level of quality is not available, we can however leverage the higher level of quality of the reference image (which is always available, also at the decoder), using the motion map at the lower level of quality for a rough motocompensation.

One way to simultaneously take into consideration the three sets of information described above is to leverage a filter whose kernel is the result of the multiplication of multiple distinct kernels, such as in the following example of trilateral filter ("trilateral" because the kernel is obtained by multiplying three distinct kernels):

$$X_i = \sum_{j=1}^{n} [H(i-j) \cdot F(Ycolor(i) - Ycolor(j)) \cdot G(Confidence_j) \cdot Norm_i] \cdot W_j$$

The first kernel, H, can be either a linear (i.e., non dependent by the values of vectors $W_j$) or non linear filter (i.e., where the weights to assign to each single $W_j$ are in fact dependent by at least some of the values of vectors $W_j$). In particular, kernel H makes sure that $X_i$ is some form of weighted average of some of the vectors of the lower level that are "located" in its vicinities. One linear embodiment would be to use a bicubic filter, which would mean that the coordinates of every vector $X_i$ at the higher level of quality would be influenced by the coordinates of the closest 16 motion vectors in the lower level of quality (FIG. 5A). Another linear embodiment would be to use a bilinear filter, so that each $X_i$ would be influenced just by 4 vectors (again FIG. 5A). Other alternatives are of course possible, such as using a Lanczos filter (6×6, 64 vectors) or any other type of filter, also non linear. An embodiment of non-linear H would be our majority-based non linear pre-conditioning (more difficult to describe mathematically, see FIG. 5B), where the "dominant vector" immediately around $X_i$ influences the weights of the kernel in such a way that the weights of all the vectors $W_j$ different from the dominant vector beyond a threshold are set to zero.

The second kernel, F, takes into account that the weight of each of the vectors that we're somewhat averaging out should be strongly reduced if the color of the pel corresponding to those vectors (which we well know, since we have the current image at the lower level of quality)

were very different from the color of the pel corresponding to $X_i$. Of course in order to do this we need to have the color of the pel corresponding to $X_j$, or a suitable estimate of it. Assuming that we have such estimate, one non-limiting embodiment to implement F is to weigh each vector with a function of the difference between the color settings of the pel corresponding to that vector in the lower quality current image and the color settings of the pel corresponding to $X_i$ in the higher quality image.

The third kernel, G, further modifies the weights given to the motion vectors $W_j$ based on their metadata. An example embodiment leveraging precision/covariance information would be to penalize the vectors with relatively low precision (i.e., with a relatively high covariance). One non-limiting embodiment to do that, in case the covariance level of each motion vector is expressed with a one-dimensional value a (e.g., the trace $\sigma^2$ of the covariance matrix, i.e. the sum of the elements in the diagonal of the matrix), would be to adjust the weight of each vector j with the following parameter:

$$\chi_j = \frac{1}{\sum_k \frac{\alpha_j}{\alpha_k}}.$$

The filtering operation (regardless of how many kernels were multiplied to obtain the final kernel) ultimately generates a set of weights that should be applied to the motion vectors W of the lower level of quality. As a last step before filtering/multiplying, though, it's always important to normalize the weights: the sum of all of the weights must be equal to 1, otherwise we would apply a scaling factor to the vectors while changing the resolution. It is thus important to normalize to 1 the summation of H·F·G with a suitable parameter $Norm_i$, obtaining the following formula:

$$X_i = \frac{\sum_{j=1}^{n} (H_i \cdot F_i \cdot G)_j \cdot W_j}{\sum_j (H_i \cdot F_i \cdot G)_j}.$$

Note that embodiments herein include implementing every possible combination of H, F and G, mentioning explicitly all of the possibilities: the final kernel of the filtering operation can be obtained as H alone, F alone, G alone, H·F, H·G, F·G, H·F·G. This is also due to the fact that not always do we have available Y-color information or motion vector metadata.

Note further that, aside from calculating the coordinates of the motion vectors of the motion map at the higher level of quality, embodiments herein can also leverage the same principles (and possibly the same formulas) to also calculate the metadata $\beta_i$ of the vector in position i, i.e. motion vector metadata for the next level of quality. One non-limiting embodiment, for instance, calculates precision value as follows (the square is due to the fact that variances are squared numbers):

$$\beta_i = \sum_{j=1}^{n} \left( \frac{(H_i \cdot F_i \cdot G)_j}{\sum_j (H_i \cdot F_i \cdot G)_j} \right)^2 \cdot \alpha_j.$$

As discussed herein in further detail, one embodiment herein includes a method of generating an auxiliary map at a second level of quality in a hierarchy based on an auxiliary map at a first level of quality and a signal encoded at multiple different levels of quality in a hierarchy. The method comprises: selecting an element from a rendition of the auxiliary map at the first level of quality; subdividing the selected element at the first level of quality into multiple sub-elements, the multiple sub-elements being at the second level of quality in the hierarchy for the auxiliary map, the second level of quality higher than the first level of quality; and based at least in part on auxiliary information assigned to at least one element in the auxiliary map at the first level of quality, generating respective auxiliary information for each of the sub-elements at the second level of quality of the auxiliary map.

In accordance with further embodiments, the second level of quality is higher than the first level of quality, the method can further comprise: selecting multiple elements from a rendition of the auxiliary map at the first level of quality; aggregating the multiple elements at the first level of quality into a parent element, the parent element being at a third level of quality in the hierarchy for the auxiliary map, the third level of quality lower than the first level of quality; and based at least in part on auxiliary information assigned to at least one element in the auxiliary map at the first level of quality, generating respective auxiliary information for the parent element at the third level of quality of the auxiliary map.

In accordance with further embodiments, the auxiliary map at the second level of quality is also an auxiliary map with respect to the signal at the second level of quality. The method can further comprise: creating a hierarchy of auxiliary maps at multiple different levels of quality, each auxiliary map including auxiliary information for the signal at a corresponding level of quality.

In accordance with further embodiments, the auxiliary information can supports a process of reconstructing the signal based on reference image information at a respective level of quality.

In accordance with further embodiments, the auxiliary map can be a motion map including motion vectors, the motion vectors indicating a relationship from one element to another.

In accordance with further embodiments, the auxiliary map can be a z-map; and the auxiliary information can include auxiliary elements indicating a depth of elements of the signal to which the auxiliary map refers at a corresponding level of quality.

In accordance with further embodiments the auxiliary map can be a class map and auxiliary elements can include information related to a class assigned to each element of the signal to which the auxiliary map pertains.

In accordance with further embodiments, the auxiliary information associated to each plane element of the auxiliary map can include, along with auxiliary vectors, meta-information relative to the contents of auxiliary vectors; and the meta-information associated to each plane element of the auxiliary map includes statistical information with respect to the auxiliary vectors.

In accordance with further embodiments, motion vector coordinates can be expressed using a polar coordinate system.

In accordance with further embodiments, the method can further comprise: identifying a signal element corresponding to a given element in the auxiliary map; identifying a set of elements in the signal at the first level of quality that are contiguous with the identified signal element at the first level of quality; analyzing auxiliary vectors associated with the identified set of signal elements; and generating a respective auxiliary vector for a particular sub-element at the second level of quality in the auxiliary map depending on auxiliary vectors associated with the identified set of elements.

In accordance with further embodiments, the respective auxiliary vector at the second level of quality can be obtained by applying a linear filter to the auxiliary vectors associated with the identified set of elements at the first level of quality.

In accordance with further embodiments, the method can further comprise: responsive to detecting that a majority of elements at the first level of quality bordering a particular sub-element of a given element at the first level of quality are assigned a substantially same auxiliary vector value within a range, assigning a calculated auxiliary vector value to a particular sub-element of the multiple sub-elements, the calculated auxiliary vector value derived from a weighted average of the values of auxiliary vectors of neighboring elements, weights of which depend on a similarity of each auxiliary vector with respect to the substantially same auxiliary vector.

In accordance with further embodiments, the method can further comprise: producing the auxiliary map based at least in part on settings information of a current image in the signal, the auxiliary map pertaining to the current image.

In accordance with further embodiments, the method can further comprise: producing the auxiliary map based at least in part on settings information of a reference image in the signal, the auxiliary map pertaining to a current image in the signal that is derived at least in part based on the reference image.

In accordance with further embodiments, the method can further comprise: leveraging settings information from the reference image by using a higher resolution rendition of the reference image adapted by means of a lower resolution motion map.

In accordance with further embodiments, the method of leveraging settings information can include: identifying color information for sub-elements in the reference image at the second level of quality based on at least one auxiliary vector associated with the selected element at the first level of quality; utilizing the color information to generate respective auxiliary vectors for the sub-elements, values of the respective auxiliary vectors following color transitions as indicated by the color information.

In accordance with further embodiments, the method can further comprise: leveraging image settings information of either the current image or a reference image in the context of a tier-based hierarchy of auxiliary maps that refer to tier-based hierarchy of current images and reference images.

In accordance with further embodiments, the method can further comprise: producing an auxiliary map at a first level of quality by applying to the contents of auxiliary vectors of the map at the first level of quality a filter characterized by a kernel obtained by multiplying a linear kernel with a kernel based on image settings. In accordance with further embodiments, the linear kernel can be a higher-order filter selected from a group consisting of: a bilinear filter, a bicubic filter, a Lanczos filter, a Mitchell-Netravali filter, and a Gaussian filter. In accordance with further embodiments, the method can further comprise: applying, to the coordinates of auxiliary vectors of the auxiliary map at a first level of quality, a filter characterized by a kernel obtained by multiplying a non-linear kernel with a kernel that is a function of image settings.

In accordance with further embodiments, the method can further comprise: producing an auxiliary map by also leveraging meta-information relative to auxiliary vectors.

In accordance with further embodiments, the meta-information can include parameters that indicate the precision of each auxiliary vector, or the covariance information of each vector, or any suitable value representing the relative or absolute quality of the vector.

In accordance with further embodiments, the method can further comprise: leveraging image setting information and meta-information to produce a rendition of the auxiliary map at a second level of quality by applying, to the auxiliary vectors of the map at a first level of quality, a filter whose kernel is obtained by multiplying a linear kernel with a kernel dependent on image settings and then with a kernel that is a function of auxiliary vector meta-information.

In accordance with further embodiments, the method can further comprise: calculating meta-information for the auxiliary vectors of the auxiliary map at the new level of quality by filtering meta-information of the auxiliary map at the previous level of quality leveraging a kernel that is a function of the kernel used to produce auxiliary vector information.

In accordance with further embodiments, the method can further comprise: refining the auxiliary map via upsampling and generating a hierarchy of motion maps.

In accordance with further embodiments, the method can further comprise: decoding an auxiliary map, the decoding including: using steps recited in claim 1 to upsample an auxiliary map, adding reconstruction data after each upsample operation to reconstruct a rendition of the auxiliary map at the higher level of quality.

In accordance with further embodiments, the auxiliary map can be a motion map.

In accordance with further embodiments, the method can further comprise: decoding the auxiliary map in accordance with a multi-level tier-based decoding protocol.

Further embodiments herein include a computer-readable storage hardware having instructions stored thereon, the instructions, when carried out by a processing device, cause the processing device to perform operations of: selecting an element from a rendition of an auxiliary map at a first level of quality; subdividing the selected element at the first level of quality into multiple sub-elements, the multiple sub-elements being at a second level of quality in the hierarchy for the auxiliary map, the second level of quality higher than the first level of quality; and based at least in part on auxiliary information assigned to at least one element in the auxiliary map at the first level of quality, generating respective auxiliary information for each of the sub-elements at the second level of quality of the auxiliary map.

The concepts briefly described above are illustrated in the corresponding figures and are further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3A is an example diagram illustrating image settings and motion maps at multiple levels of quality according to embodiments herein.

FIG. 4 is an example diagram illustrating different embodiments of a signal processor and upsampling motion maps according to embodiments herein.

FIG. 5B is an example diagram illustrating upsampling of an element into multiple sub-elements using a unilateral, non-linear according to embodiments herein.

FIG. 5C is an example diagram illustrating upsampling of an element into multiple sub-elements using a unilateral, non-linear according to embodiments herein.

FIG. 7A is an example diagram illustrating upsampling of an element into multiple sub-elements using a trilateral filter according to embodiments herein.

FIG. 9 is an example diagram illustrating a method of upsampling according to embodiments herein.

FIGS. 10A, 10B, and 10C are example diagrams illustrating different ways to a motion vectors based on setting information at one or more levels of quality according to embodiments herein.

FIG. 12 is an example diagram illustrating use of motion map upsampling during motion map decoding according to embodiments herein.

DETAILED DESCRIPTION OF EMBODIMENTS

Figure 1:
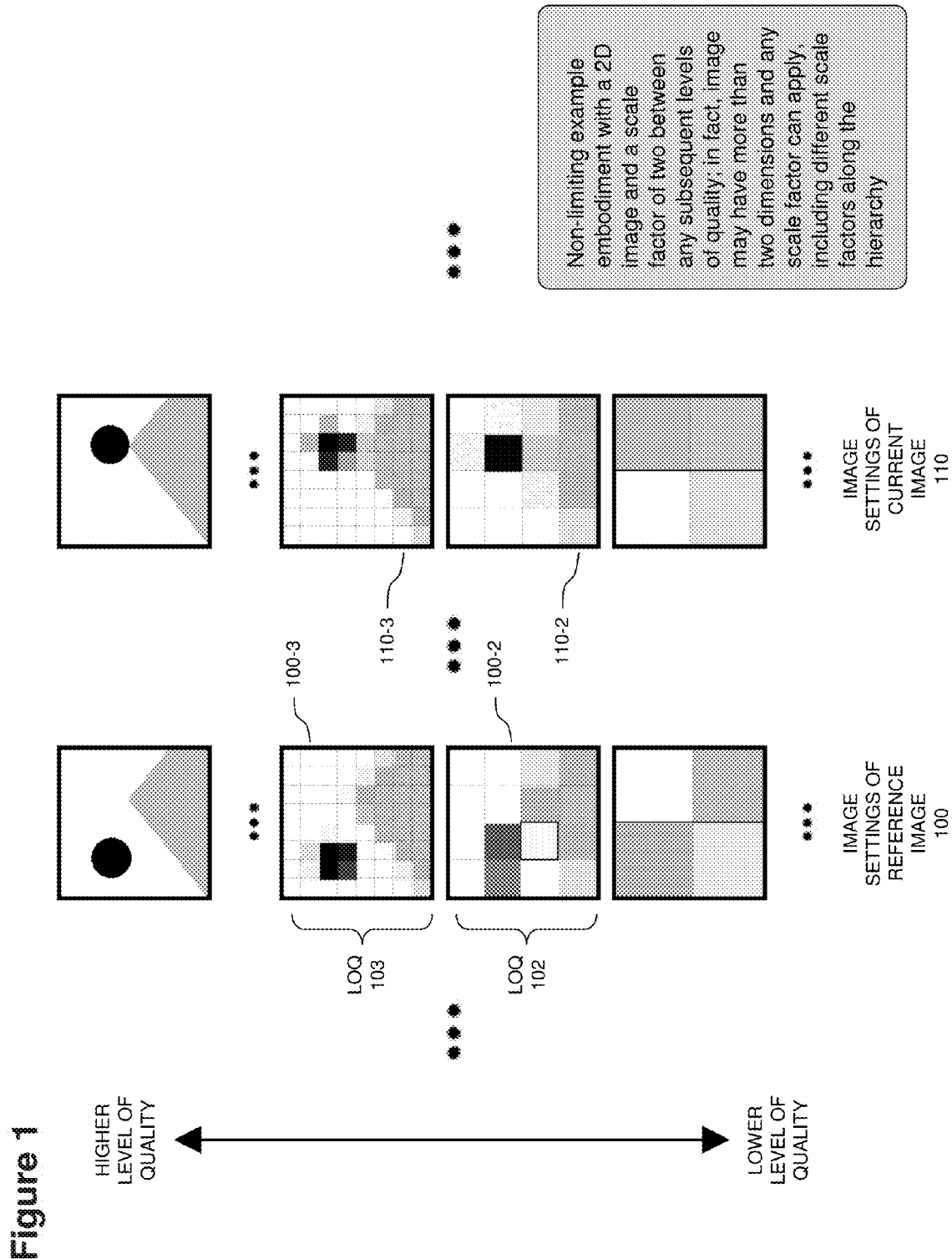
FIG. 1 is an example diagram illustrating settings of a current image with respect to a reference image encoded at different levels of quality according to embodiments herein.

FIG. 1 is an example diagram illustrating settings of a current image with respect to a reference image; each encoded at different levels of quality according to embodiments herein.

In general, each column of signal settings information at multiple different levels of quality enables reproduction of a respective frame of elements at a higher level of quality for display. Typically, the objects captured by a rendition of the image at the lower level of quality for each frame are unrecognizable. However, the images are upsampled from a lower level of quality to a respective higher level of quality for playback. As shown, the images at the higher level of quality include discernible shapes such as object 120 that moves from one frame to another.

By way of a non-limiting example, settings of reference image 100 can represent a first frame in a sequence of video, settings of current image 110 can represent a second frame in a sequence of video, and so on. As mentioned, the object 120 moves with respect to the triangle from one frame to the next.

As shown, sequence of columns (e.g., a frame) includes, in a respective hierarchy, settings of reference image 100, settings of current image 110, etc. Playback of the reconstructed images for the frames in the sequence can include decoding respective reconstruction data in the different columns and displaying moving images as captured by the images on a display screen.

Reconstruction of an original signal (e.g., reconstruction data such as image setting information, motion maps, etc.) for a first frame can include repeated upsampling from one level of quality to the next. For example, upsampling to produce a rendition of the reference image can include steps of upsampling the settings of reference image 100-1 from level of quality 101 to settings of reference image 100-2 at a next higher level of quality 102, upsampling the settings of reference image 100-2 from level of quality 102 to settings of reference image 100-3 at a next higher level of quality 103, and so on.

Upsampling to produce a rendition of the current image can include a step of upsampling the settings of current image 110-1 from level of quality 101 to settings of current image 110-2 at a next higher level of quality 102, upsampling the settings of current image 110-2 from level of quality 102 to settings of current image 110-3 at a next higher level of quality 103, and so on.

Note that the elements in the FIG. 1 can represent any suitable type of data information. By way of a non-limiting example, the elements at the different levels of quality can be image data, symbols, etc., indicating settings of each of multiple signal elements (e.g., pels/plane elements, pixels/picture elements, voxels/volumetric picture elements, etc.) in a respective image. The image can be two dimensional (e.g., pictures, video frames, 2D motion maps, etc.), three-dimensional (e.g., 3D/volumetric images, holographic images, CAT-scans, medical/scientific images, 3D motion maps, etc.), or even feature more than three dimensions. In accordance with such an embodiment, the settings of the signal elements indicate how to reconstruct the original signal for playback on a device.

Each element can be defined by one or more settings such as color, hue, etc. In accordance with such an embodiment, the color component of an element in the signal data can be encoded in accordance with a suitable color space standard such as YUV, RGB, HSV, etc.

In one embodiment, the highest level of quality in a column represents a high-resolution rendition of the respective frame. Each frame of the signal 115 can be encoded (via reconstruction data) according to one or more lower levels of quality in the hierarchy.

In one embodiment, the renditions of a respective frame at the lower level of quality beneath the highest level of quality are akin to lower resolution thumbnail representations of an original frame of the corresponding image signal. For example, the reconstruction data for reproducing a rendition of the image signal have been downsampled to lower levels of quality. The reconstruction data at the lower levels of quality capture settings of lower resolution renditions of the image signal. The renditions of the respective frame at the lower levels of quality do not include all of the signal details as would renditions of the frames as the higher levels of quality. In one embodiment, the renditions of a frame of the signal at the lower level of quality capture coarse attributes of the original signal, but not the more detailed finer attributes of the original signal. The detailed, finer attributes of the signal appear in the rendition of frame of the signal at higher levels of quality.

As mentioned, the reference image can include a respective object 120 (e.g., circle) or multiple objects that appears to move with respect to a constant background over one or more other frames. That is, assume in this example that circle (e.g., object 120) moves in a sequence of frames. Note that objects become sufficiently large at the highest resolution of playback such that the lower resolution versions of the image signal for a respective frame include a version of the moving object. As shown, the object 120 may not appear in a rendition of a respective frame of the signal at one or more lower or lowest levels of quality. However, the object 120 becomes more detectable and refined at the higher levels of quality foe each of the frames.

Figure 2:
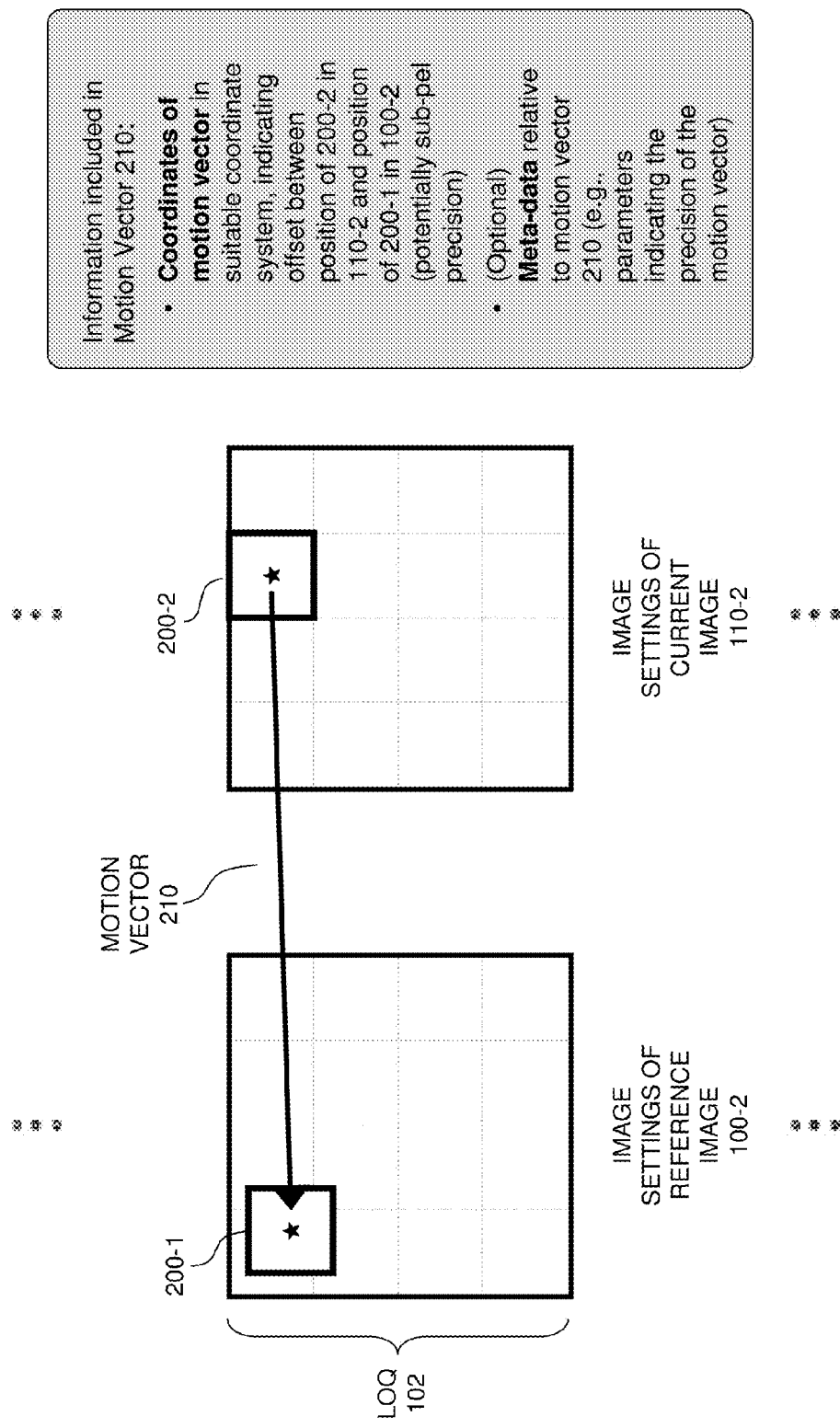
FIG. 2 is an example diagram illustrating use of a motion vector and motion vector information according to embodiments herein.

FIG. 2 is an example diagram illustrating the concept of a motion vector and sub-element precision according to embodiments herein.

As shown, by way of a non-limiting example, at example level of quality 102, the motion vector 210 for element 200-2 indicates an offset between position of element 200-2 in the current image with respect to element 200-1 in the reference image. The motion vector 210 indicates that settings associated with the element 200-2 are related to or can be derived at least in part based on the settings associated with element 200-1 in the reference image.

As shown, the precision of the motion vector can be greater than a resolution of elements at the corresponding level of quality.

Each element, sub-element, etc., in the current image can have a motion vector pointing to a position of a corresponding element in the reference image.

In certain cases, a respective motion vector for an element may be zero or null, indicating that the corresponding element in the current image is not related to elements in the reference image.

The information included in the motion vector 210 can vary depending on the embodiment. For example, in one embodiment, the motion vector 210 specifies a positional offset value of the corresponding element in the current image with respect to an element in the reference image. Each motion vector can include additional information such as a parameter indicating a confidence level, precision, etc., associated with the offset value.

In accordance with other embodiments, the motion vector need not specify a corresponding element in the reference image. Instead, the values for each element in the motion map can be binary indicating whether there is motion associated with the element or not.

FIG. 3A is an example diagram illustrating upsampling of an auxiliary map such as a motion map according to embodiments herein.

As shown, the current image 110 has a corresponding motion map 310 (i.e., auxiliary map). The motion map 310 for the current image can be upsampled from a lower level of quality to the higher levels of quality in a hierarchy as shown.

As discussed above, in FIG. 2, each element in a respective motion map can specify via a motion vector 210 (e.g., motion vector information or metadata), that images settings associated with a corresponding element can be derived from settings of an element in the reference image.

In this example, the motion vector 210 in motion map 310-2 specifies that settings of the element 200-2 in the current image is related to or can be derived from settings of element 200-1 in the reference image. Thus, the motion maps 310 (e.g., motion map 310-1, 310-2, 310-3, . . . , 310-N) at the different levels of quality indicates a relationship of the elements (at different levels of quality) in the current image 110 (i.e., a current signal) with respect to the reference image (i.e., a reference signal).

As discussed herein, the motion maps for the current image can be repeatedly upsampled from a motion map 310-1 at a lower level of quality to a dense motion map 310-N at a higher level of quality.

As mentioned, in one embodiment, the motion vectors in the motion maps indicate an object, a location of which happens to be moving from one frame to the next in a video sequence of multiple frames.

Figure 3B:
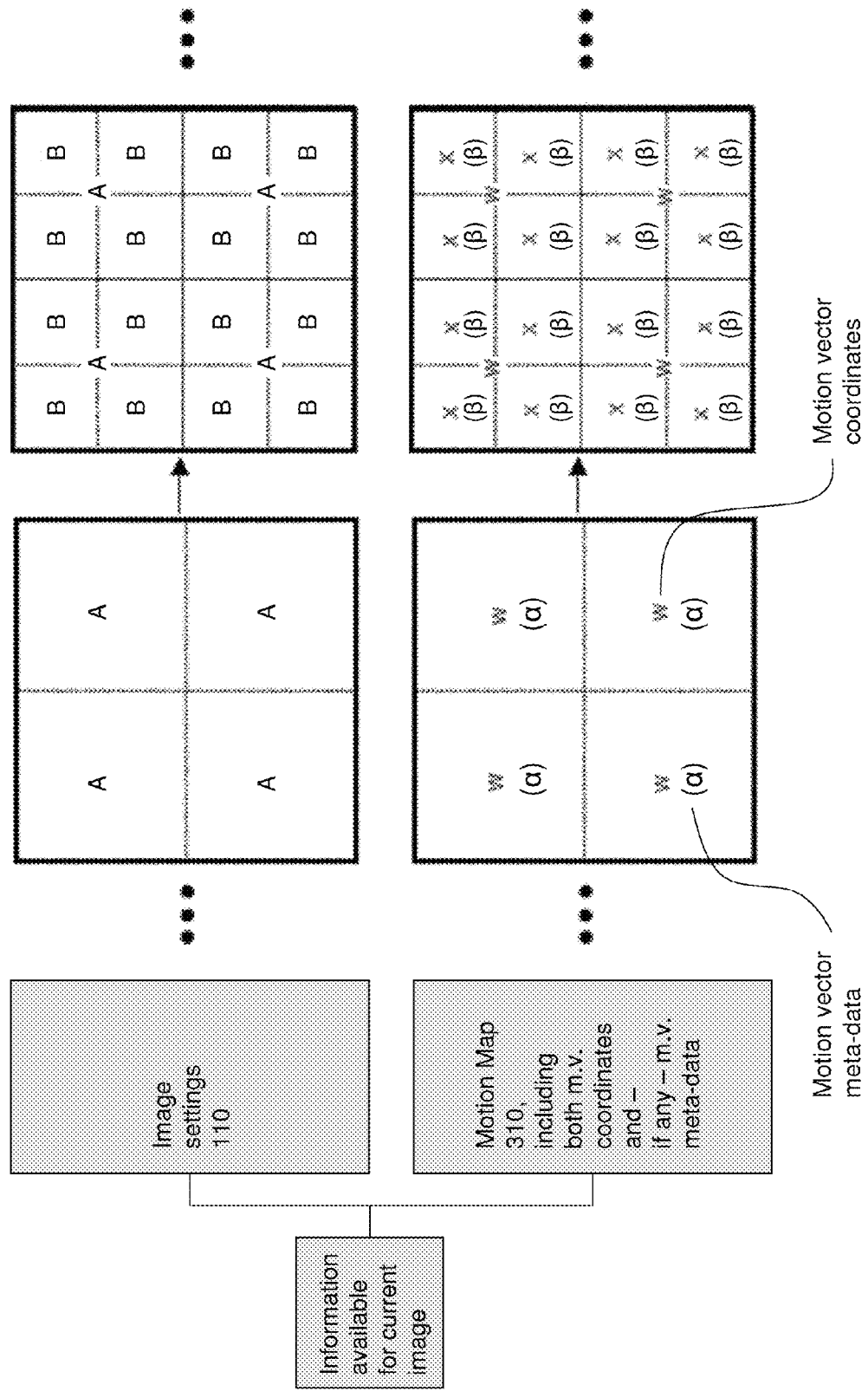
FIG. 3B is an example diagram illustrating image settings and motion maps at multiple levels of quality according to embodiments herein.

FIG. 3B is an example diagram illustrating current image setting and corresponding motion map information according to embodiments herein.

As shown, the field of the image at level of quality 101 includes multiple elements labeled A. When upsampling, each of the elements labeled A at level of quality 101 is subdivided into multiple B-type elements at the next higher level of quality 102. For example, during upsampling, element A1 subdivides into elements B1, B2, B3, and B4 as shown.

Recall that each element in the current image can have a corresponding motion vector and metadata based on information stored in the corresponding motion map. For example, W1 (e.g., a motion vector) and a1 (e.g., metadata) include information about element A1, W2 (e.g., a motion vector) and a2 (e.g., metadata) include information about element A2, and so on.

Additionally, at level of quality 102, X1 and b1 include information about element B1, X2 and b2 include information about element B2, and so on.

In one embodiment, an aggregation of the four elements B1, B2, B3, and B4 cover the same visual display area or volume as does the parent element A1.

FIG. 4 is an example diagram illustrating multiple ways of upsampling according to embodiments herein.

In the first example, at the encoder, full information on the current image is available at the higher resolutions. In such an embodiment, the signal processor 400-1 receives upsampling commands indicating to upsample a respective motion map. During operation, the motion map resolution changer 410-1 utilizes the image settings for the current image 110 at the level of quality K, the corresponding motion map for the current image at level of quality K, and the image settings of the current image at level of quality K+1 to derive the motion map at level K+1.

In the second example, at the decoder, processing includes upsampling a respective motion map. The signal processor 400-1 does not have available higher resolution renditions of the current image. In such an embodiment, the signal processor 400-1 can be configured to make the most out of what information is available, leveraging the higher resolution rendition of the reference image (the closest thing that we have to the current image).

For example, in this latter embodiment, the signal processor 400-1 receives upsampling commands indicating to upsample a respective motion map. During operation, the motion map resolution changer 410-1 utilizes the image settings for the current image 110 at the level of quality K, the motion map for the current image at level of quality K, and the estimate of the image settings for the current image at level of quality K+1 to generate the motion map at level of quality K+1. As shown, the motion compensator 450-1 receives the motion map at level of quality K and the image settings for the reference image at level of quality K+1 to produce the estimate of the image settings for the current image at level of quality K+1.

One non-limiting embodiment can include, instead of looking at color settings in the same positions as element $W_j$, embodiments herein can include applying an offset equal to the closest motion vector in the lower resolution motion map. Thus, it is possible to compensate the higher resolution reference image leveraging the lower resolution motion map.

Note that the resolution changer 410-1 as described herein is versatile: it can be used during upsampling (e.g., in a decoder) or downsampling (e.g., in a decoder).

Figure 5A:
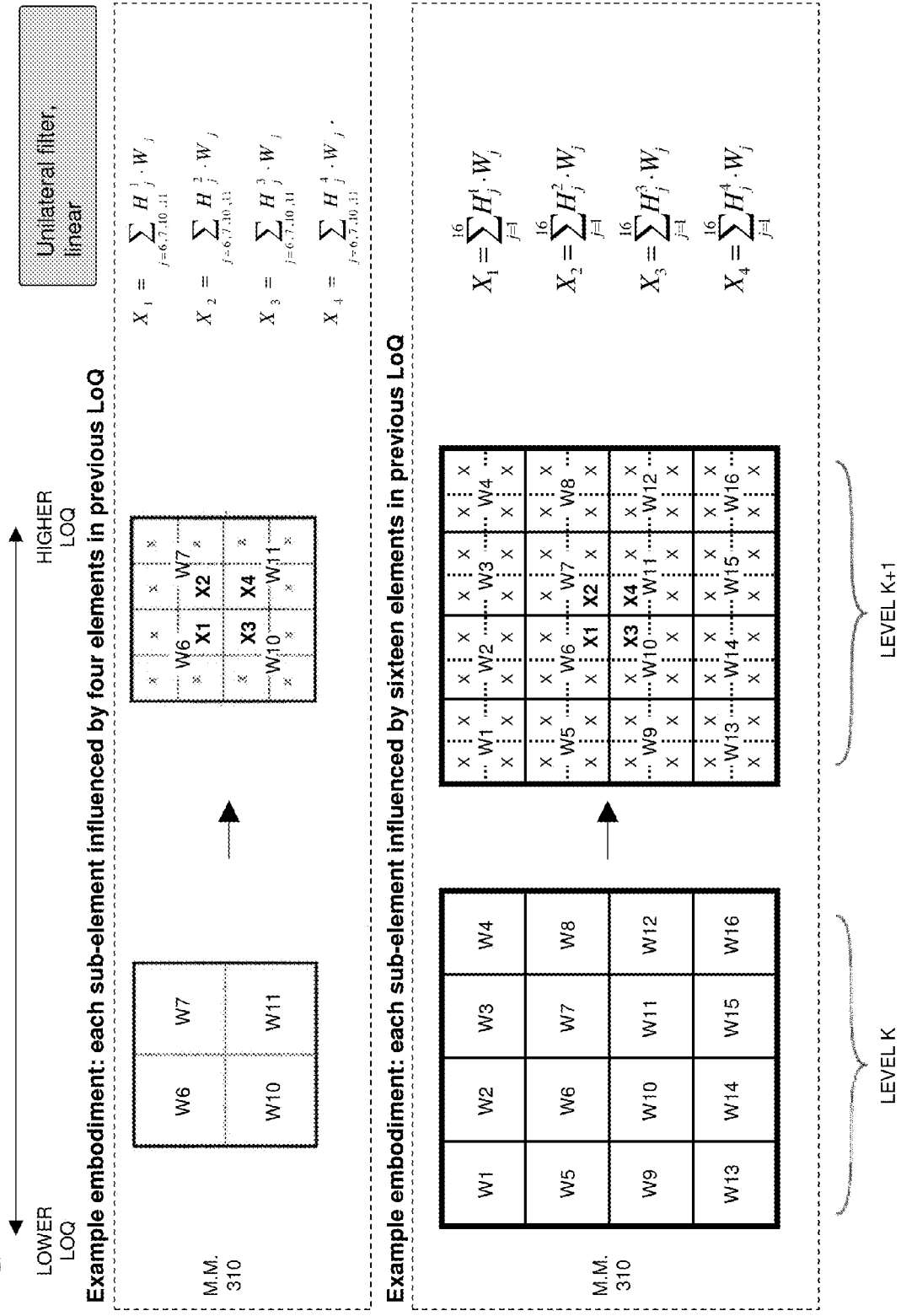
FIG. 5A is an example diagram illustrating upsampling of an element into multiple sub-elements using a unilateral, linear filter according to embodiments herein.

FIGS. 5A, 5B, and 5C are example diagrams illustrating different techniques of upsampling according to embodiments herein.

In general, these figures show example embodiments of "simple" filters (unilateral filters, with kernel H) to upsample a motion map. The groupings of elements that are shown may just be a portion of an image at the two levels of quality (e.g., a 4×4 area of a much larger image, which should be upsampled into an 8×8 area), not necessarily the whole image.

Unilateral filters can either be linear (i.e., FIG. 5A, featuring as kernel/weights a matrix of fixed coefficients for every position i, regardless of the values of W).

The unilateral filter can be non-linear (e.g., FIG. 5B, featuring as kernel a matrix of coefficients that depends both on i and on the specific values of the motion vectors W). Examples of linear kernels would be bilinear filters (where every pel in the new level of quality is influenced by the four closest pels around it in the previous level of quality), bicubic filters (16 closest pels), Lanczos filters (64 closest pels), etc.

FIG. 5C illustrates an example embodiment of a majority-based non-linear filter. The majority decision taken based on the vectors closer to $X_i$ influences the weights of a standard kernel (e.g., on the larger 4×4 block on which a standard bicubic filter applies), setting to zero the weights of motion vectors that are very different form the "majority motion vector", and then applying normalized bicubic filter weights with the remaining vectors.

In one embodiment, the equations of the filters are as follows:

$$X_i = \sum_j H_j^i \cdot W_j$$

$$X_i = \sum_{j=1}^{N} H_j^i(W_1, ..., W_N) \cdot W_j$$

In general, these equations indicate how to derive a setting for sub-elements at the next higher level of quality in the hierarchy. For example, he figures indicate that the motion map 310 at level K includes values W6, W7, W10, and W11. As mentioned, the weights, W, indicate motion vector information for a corresponding element at level of quality K.

As shown, when upsampling, element W6 is sub-divided into four elements including element X1; element W7 is sub-divided into four elements including element X2; element W10 is sub-divided into four elements including element X3; element W11 is sub-divided into four elements including element X4; and so on.

As shown, one embodiment herein includes generating motion vector settings information for element X1 in motion map 310-A at level of quality K+1 based on settings of elements W6, W7, W10, and W11; generating motion vector settings information for element X2 in motion map 310-A at level of quality K+1 based on settings of elements W6, W7, W10, and W11; generating motion vector settings information for element X3 in motion map 310-A at level of quality K+1 based on settings of elements W6, W7, W10, and W11; and so on. The values for $H_j$ are weights, magnitudes of which are determined based on filter H.

Accordingly, the motion vector settings information for a respective sub-element (e.g., X1) into which the parent element (e.g., W6) is divided can be based on weightings of the settings associated with element W6, W7, W10 and W11; the motion vector settings information for a respective sub-element (e.g., X2) into which the parent element (e.g., W7) is divided can be based on weightings of the settings associated with element W6, W7, W10 and W11; and so on.

As shown in the second portion of FIG. 5A, the settings for sub-elements in the motion map during upsampling can be derived based on an expanded field of elements at the lower level of quality. For example, the elements X in motion map 310-B are derived based on a corresponding set of equations that take into account setting sequence of frames a wider field of motion vector information. For example, the element X1 in motion map 310-B at level of quality K+1 can be derived from settings associated with elements W1, W2, W3, W4, W5, W6, W7, W8, W9, W10, W11, W12, W13, W14, W15, and W16.

Figure 6:
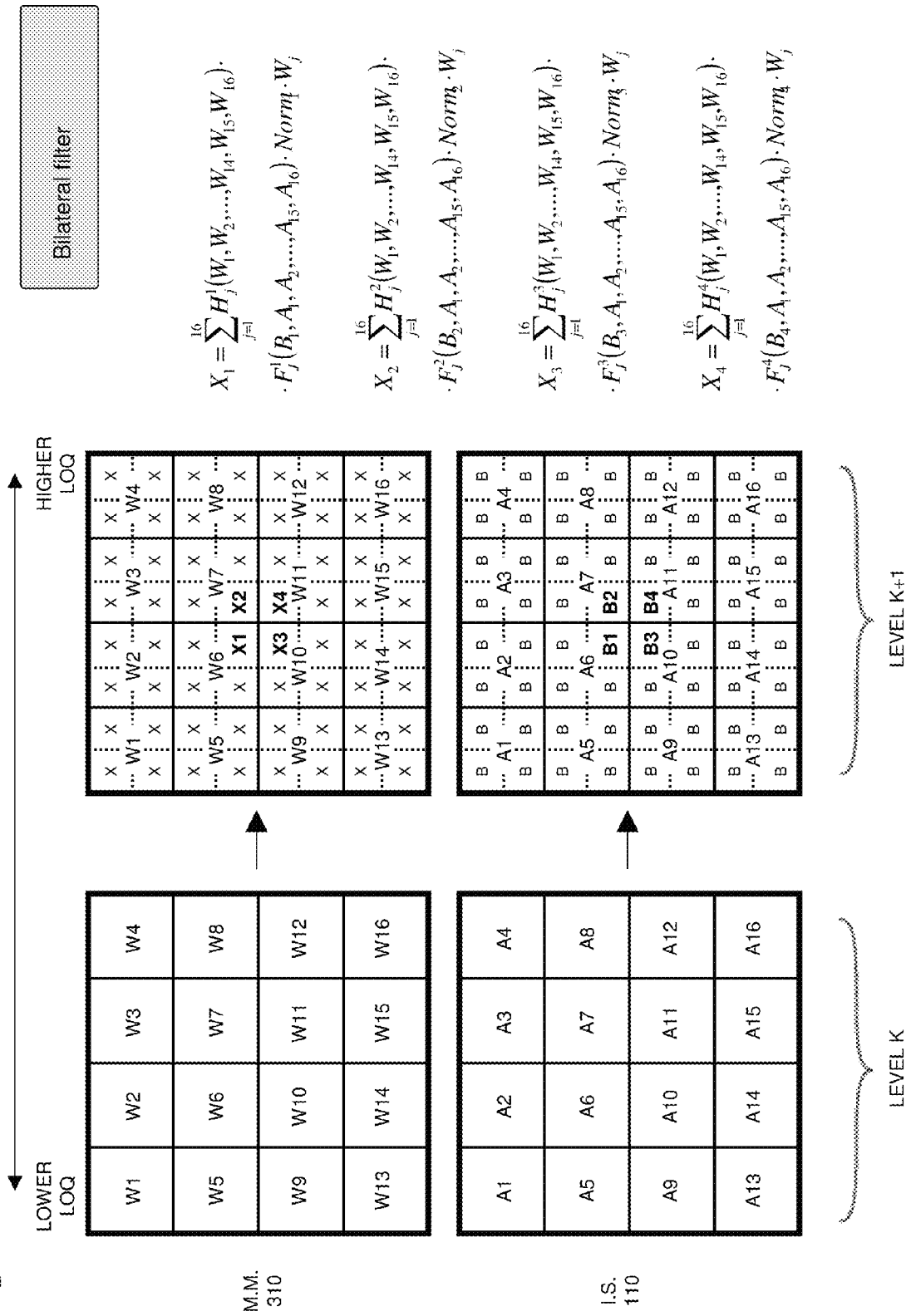
FIG. 6 is an example diagram illustrating upsampling of an element into multiple sub-elements using a bilateral filter according to embodiments herein.

FIG. 6 is an example diagram illustrating implementation of a bilateral filter function to upsample a motion map according to embodiments herein.

FIG. 7A is an example diagram illustrating implementation of a trilateral filter function to upsample a motion map according to embodiments herein.

Figure 7B:
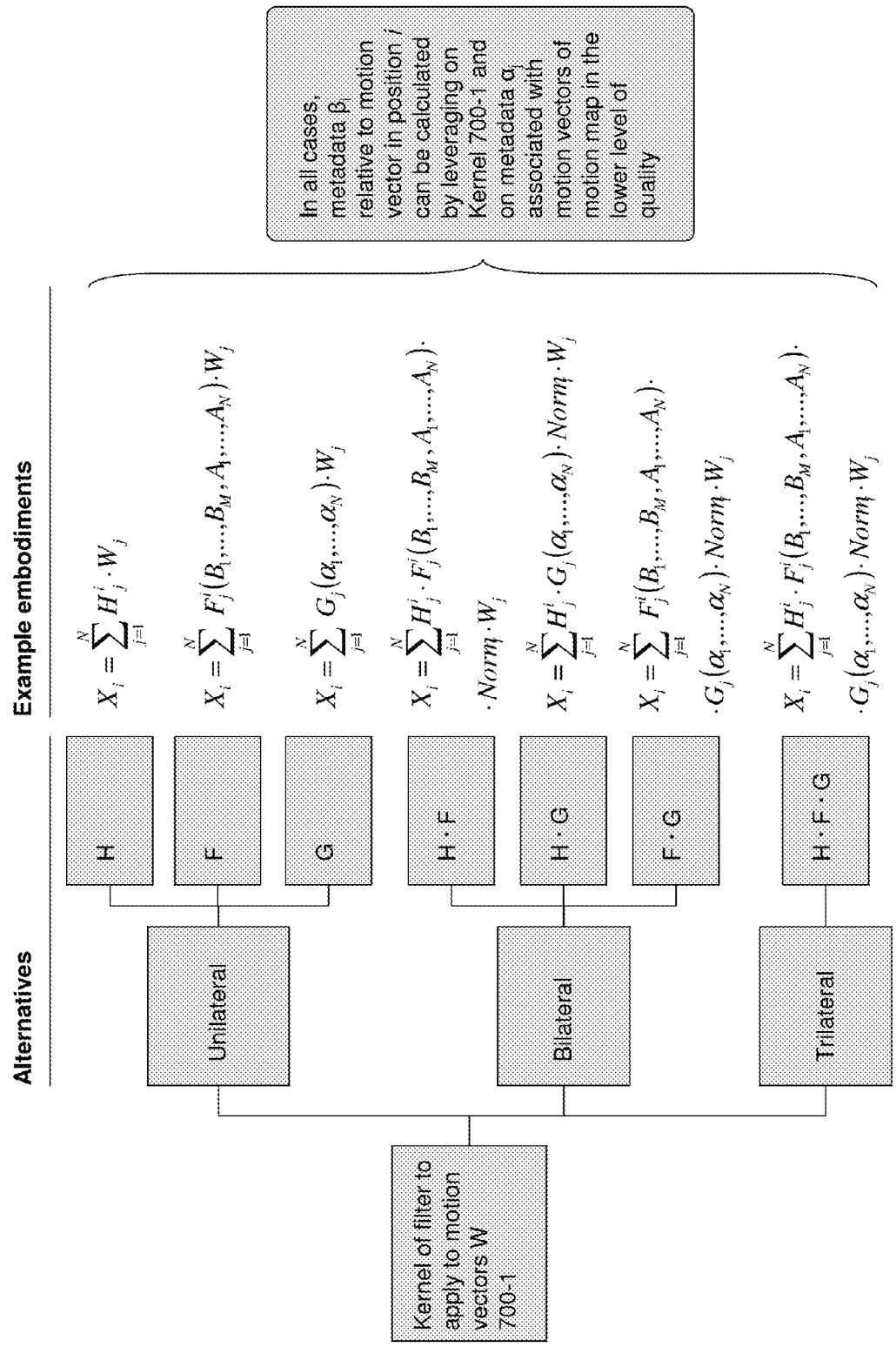
FIG. 7B is an example diagram illustrating different upsampling algorithms according to embodiments herein.

FIG. 7B is an example diagram illustrating different combinations of filters that can be used to upsample motion map information according to embodiments herein.

High level representations of the concepts of multiplying kernels H, F and G to obtain the final kernel of the filter (in the non limiting example cases of using kernels that consider 16 motion vectors around the element i to calculate). In one embodiment, the same final kernel of the filter can also be used to calculate the new metadata assigned to motion vectors of the motion map at the new level of quality.

Formulas express H as non-linear, but it is important to specify that the linear case (H independent from W) is just a specific case of the more general non-linear case.

As mentioned, any combination of filters can be used to upsample the motion maps. For example, combinations are possible and include H alone (linear or non-linear), F alone, G alone, HF (both with H linear and with H non-linear), HG (both with H linear and with H non-linear), FG and HFG (both with H linear and with H non-linear). Also, the kernels that are multiplied to obtain the final kernel for the filters can be used to generate the respective metadata for the element i.

Some example equations include: (note that FIG. 7B includes more equations):

$$X_i = \sum_{j=1}^{N} H_j^i \cdot F_j^i(B_1, ..., B_M, A_1, ..., A_N) \cdot Norm_i \cdot W_j$$

$$X_i = \sum_{j=1}^{N} H_j^i \cdot F_j^i(B_1, ..., B_M, A_1, ..., A_N).$$

$$\cdot G_j(\alpha_1, ..., \alpha_N) \cdot Norm_i \cdot W_j$$

$$\beta_i = \sum_{j=1}^{N} L_i(W_1, ..., W_N, B_1, ..., B_M, A_1, ..., A_N, \alpha_1, ..., \alpha_N) \cdot \alpha_J$$

$$\beta_i = \sum_j L_i(H^i, F^i, G) \cdot \alpha_J$$

Figure 8:
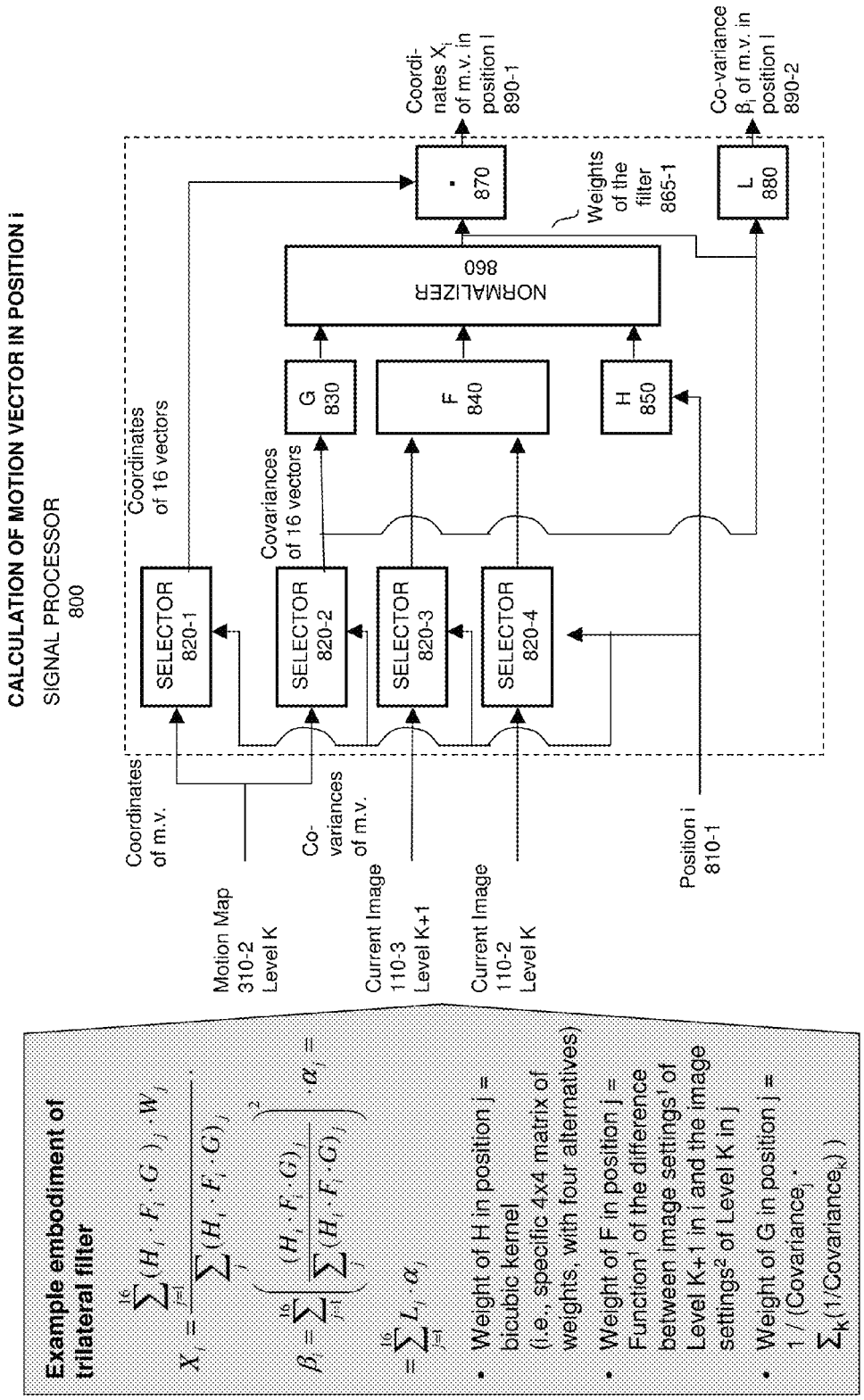
FIG. 8 is an example diagram illustrating a signal processor to upsample motion maps according to embodiments herein.

FIG. 8 is a diagram illustrating a specific non-limiting example embodiment of a trilateral filter according to embodiments herein.

As shown, using a bicubic kernel as H (which means that weights can be precalculated, since there are only four possible sets of weights depending on the position of i with respect to the 16 elements j), a weight based on the difference of color settings as F and a simple variation on weighted average for covariances, taking into account that higher covariance means lower confidence for the motion vector.

Note that the flow diagram in FIG. 8 illustrates how a specific motion vector $X_i$, of the higher resolution motion map is calculated, i.e., it calculates a single pel of the higher resolution map. In practice, there are a number of possible ways to apply and modify this flow graph in order to upsample an entire motion map made of many pels: the whole processing can be either fully sequential or fully parallel or a mix thereof.

FIG. 9 is an example diagram illustrating a method of upsampling according to embodiments herein.

FIG. 10A is an example diagrams illustrating upsampling of motion vectors using a simple H filter according to embodiments herein.

The values in parenthesis for each element (e.g., for each parent element and respective sub-elements at the next higher level of quality) indicate Cartesian coordinates of the motion vectors. Based on application of the simple H filter as discussed herein, sub-elements are assigned values of (13.4, 10.9), (53,35.6), (52.5,35.3), (60.1, 40.1). In certain cases, use of the H filter (such as in this e) may be undesirable because generated motion vector information may result in poor reconstruction of a sharp transition in an image.

Figure 10B:
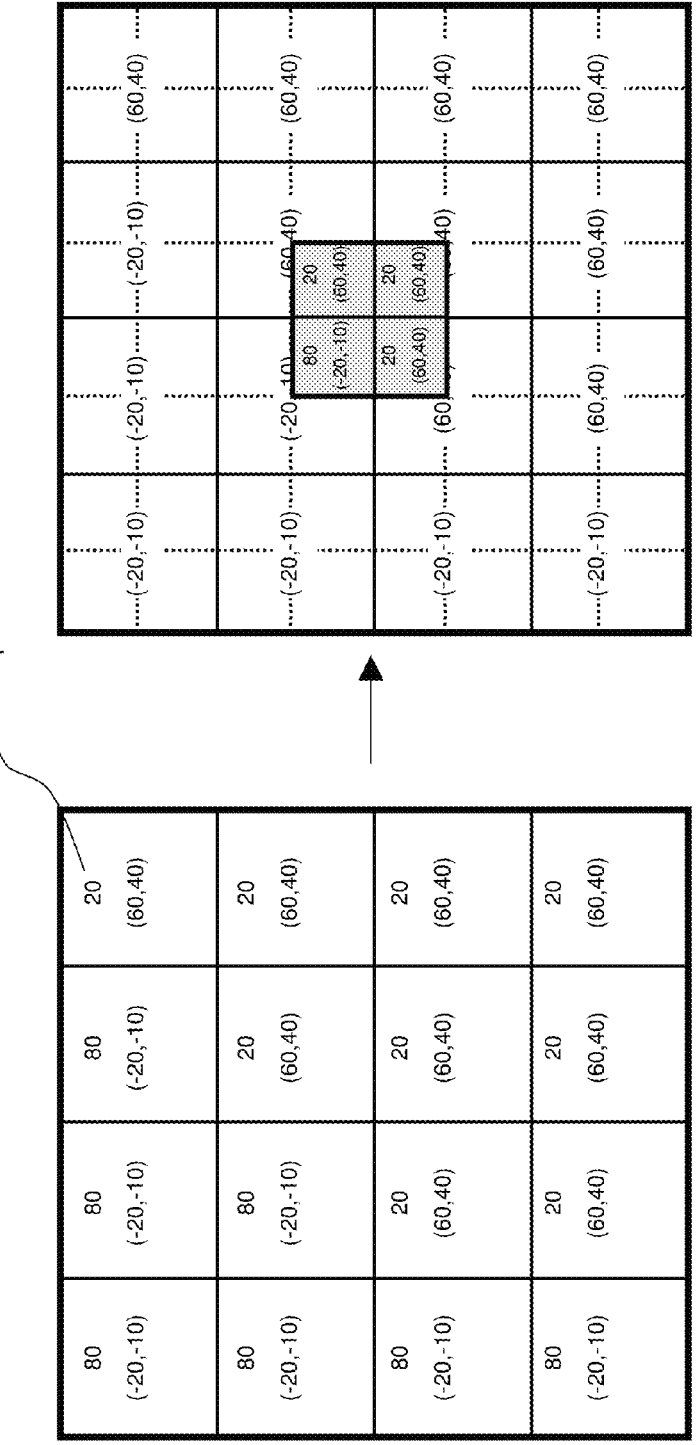

FIG. 10B is an example diagrams illustrating upsampling of motion vectors using a simple H filter cascaded by an F filter that takes into account color settings (e.g., settings 20 and 80) of corresponding elements according to embodiments herein.

The values in parenthesis for each element (e.g., for each parent element and respective sub-elements at the next higher level of quality) indicate Cartesian coordinates of the motion vectors. Based on application of the HG as shown, sub-elements are assigned values of color value setting 80 coordinate (−20,−10), 20 (60,40), 20 (60,40), and 20 (60, 40). In this case, the motion vector information is not averaged out. The generated motion vector information for the sub-elements preserves a sharp transition because the derived motion vector settings directly follow the color transition (e.g., border snapping).

Figure 10C:
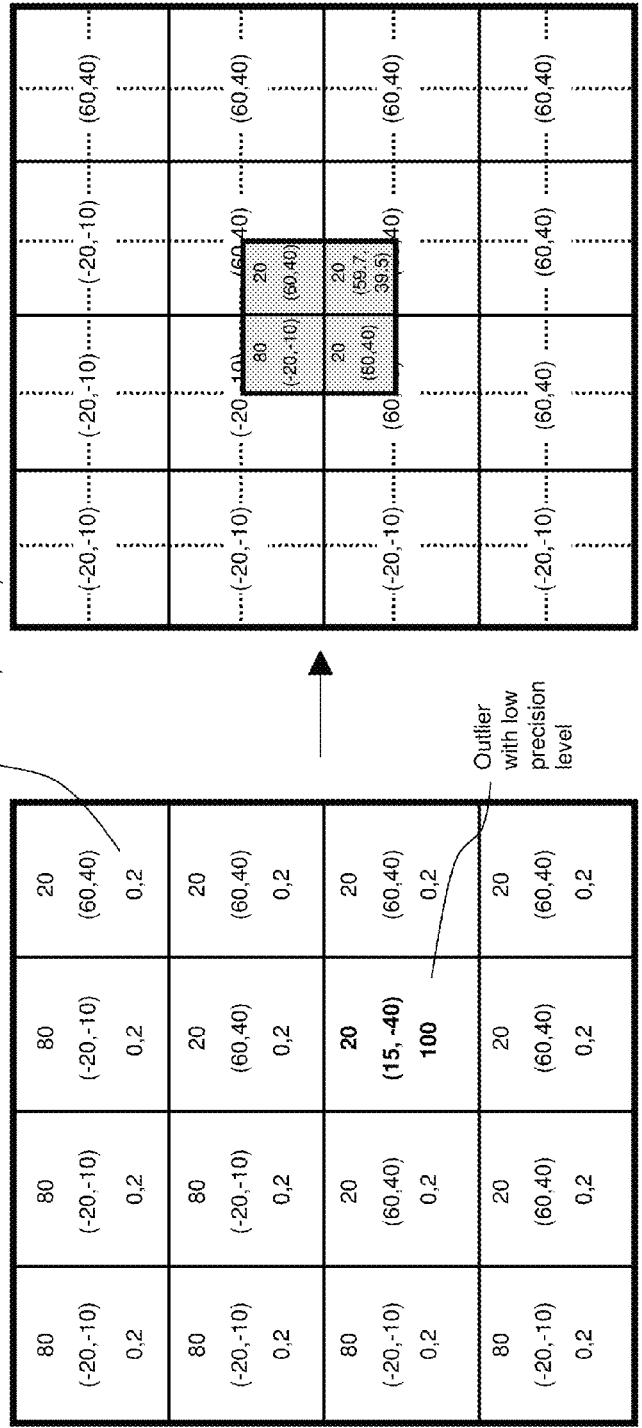

FIG. 10C is an example diagrams illustrating upsampling of motion vectors using a combination H F G filter according to embodiments herein. The Cartesian coordinates and the color value setting for each element is the same as previous FIG. 10B. Each element can include a confidence value setting (e.g., covariance=0.2).

The values in parenthesis for each element (e.g., for each parent element and respective sub-elements at the next higher level of quality) indicate Cartesian coordinates of the motion vectors. Based on application of the combination HFG filter as discussed herein, the sub-elements are assigned values of color value setting 80 coordinate (−20,−10), 20 (60,40), 20 (60,40), and 20 (59.7, 39.5). This case takes into account confidence levels or variance of the motion vectors. The higher the variance, the lower the confidence for a respective motion vector. Motion vectors assigned lower confidence values are given very low weight when determining a setting for a respective sub-element. That is, the settings 20 (15, −40) 100 for the respective element is an outlier that has little upsampling weight when on producing setting 20 (59.7, 39.5) for the respective sub-element. The generated motion vector information for the sub-elements preserves a sharp transition because the motion vector settings directly follow the color transition (e.g., border snapping).

Figure 11:
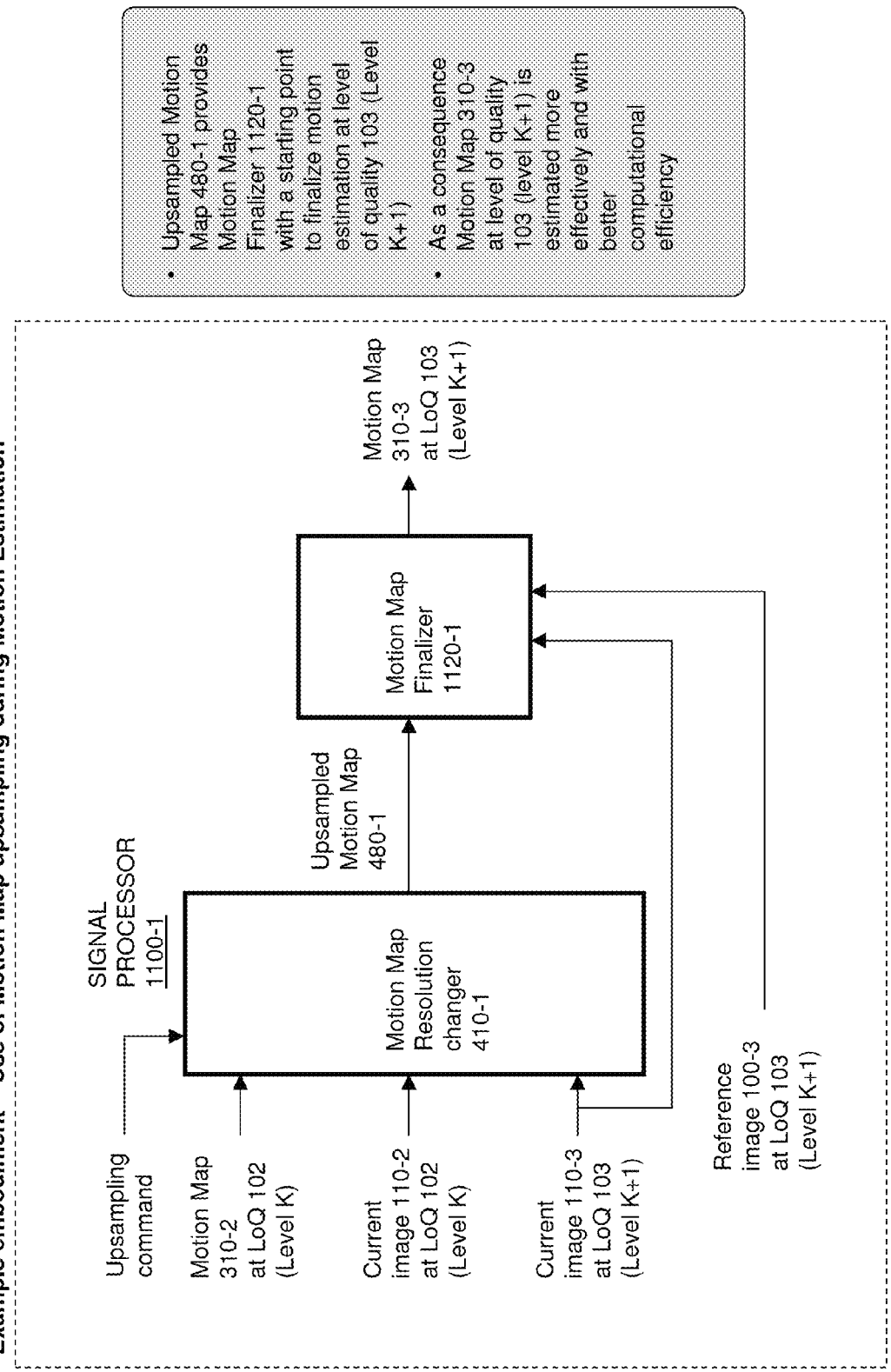
FIG. 11 is an example diagram illustrating use of motion map upsampling during motion estimation according to embodiments herein.

FIG. 11. How the upsampling algorithm can be leveraged in order to produce more accurate motion maps starting from lower resolution ones. The upsampled motion map 480-1 is inputted to motion map finalizer 1120-1 to finalize motion estimation at level of quality 103 (e.g., level of quality K+1). As a consequence, motion map 310-3 at level of quality K+1 is estimated more effectively and with better computational efficiency.

FIG. 12 is an example diagram illustrating how the upsampling algorithm as discussed herein can be leveraged in order to reconstruct a higher resolution rendition of a motion map starting with a lower resolution one according to embodiments herein.

In general, the resources in FIG. 12 can reside in a decoder that performs reconstruction via upsampling operation and use of residual data.

Upsampled motion map 480-1 provides motion map reconstructor 1220-1 with a starting point to reconstruct a rendition of motion map 310-3 at level of quality 103 (e.g., level of quality K+1). Motion map reconstruction data 1250-1 (e.g., residual data indicating adjustments to be made to motion vectors of unstapled motion map 480-1) allows motion map reconstructor 1220-1 to fully reconstruct a rendition of motion map 310-3 at level of quality 103.

Further note that either the motion map information and/or residuals or both can be expressed in polar coordinate system. The motion map and residual data are not necessarily expressed in the same coordinate system.

Note that the techniques in related applications fully apply here. For example, see U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference. Also, see U.S. patent application Ser. No. 13/188, 201 entitled "TIERED SIGNAL DECODING AND SIGNAL RECONSTRUCTION," filed on Jul. 21, 2011, the entire teachings of which are incorporated herein by this reference.

Figure 13A:
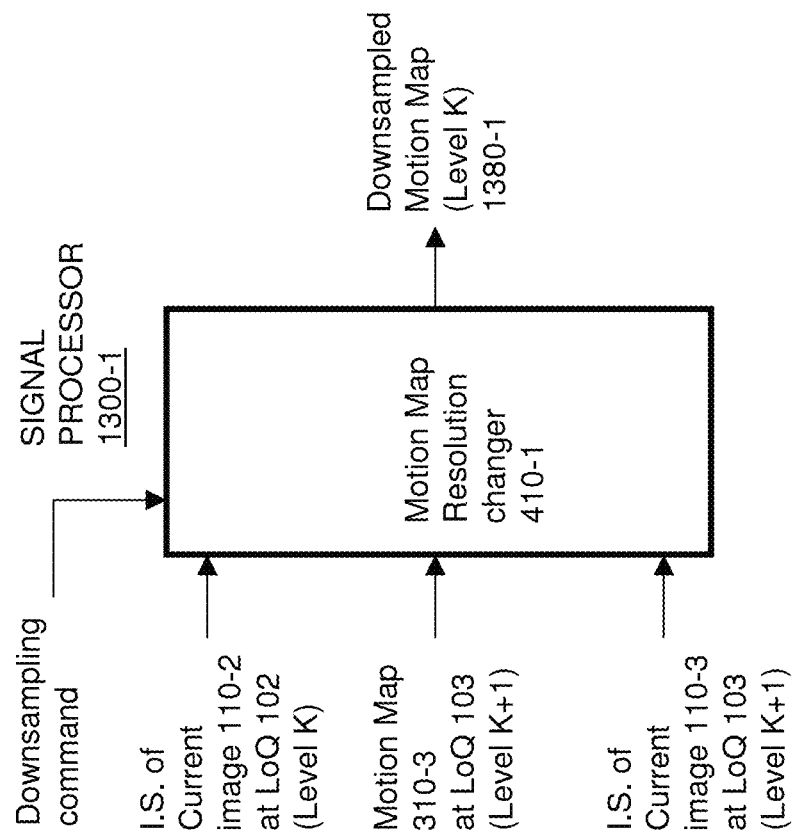
FIG. 13A is an example diagram illustrating a signal processor to downsample a motion map according to embodiments herein.

FIG. 13A is an example diagram illustrating a signal processor configured to downsample according to embodiments herein.

As shown, the motion map resolution changer 410-1 receives downsampling commands.

The motion map resolution changer 410-1 receives image settings of current image 110 for level of quality K, a respective motion map at level of quality K+1, and settings of current image at level of quality 103. Via the received information, the motion map resolution changer 410-1 produces a downsampled motion map for level of quality K. The signal processor 1300-1 repeats these steps for each of the multiple level of quality in the hierarchy down to the lowest level of quality.

Figure 13B:
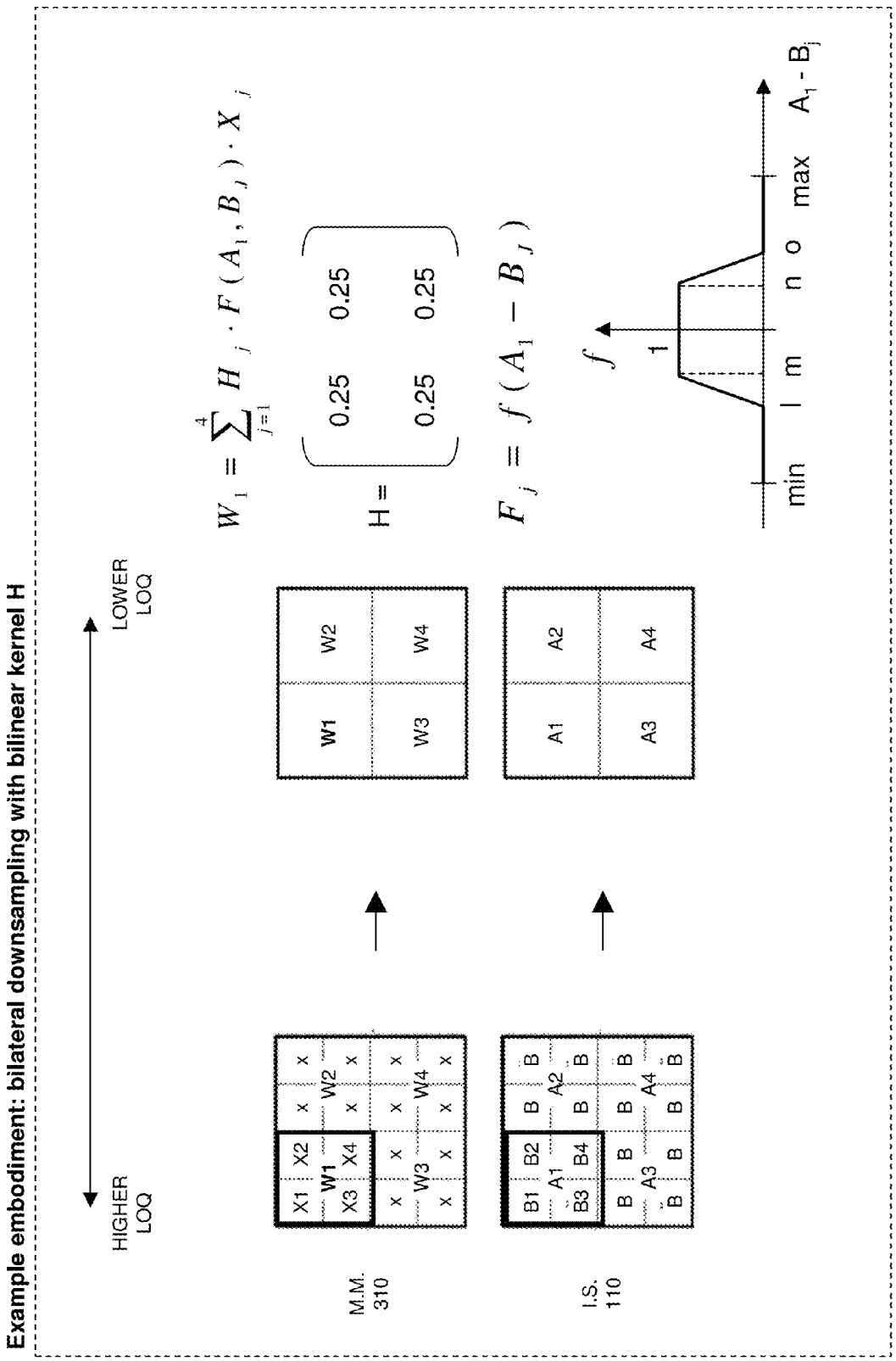
FIG. 13B is an example diagram illustrating bilateral downsampling with a bilinear kernel H filter according to embodiments herein.

FIG. 13B is an example diagram illustrating bilateral motion map downsampling using a bilinear kernel H filter according to embodiments herein. As shown, embodiments herein include leveraging a bilateral filter where H is a simple bilinear kernel and f is a non-linear function of the differences between A1 and Bj.

Figure 14:
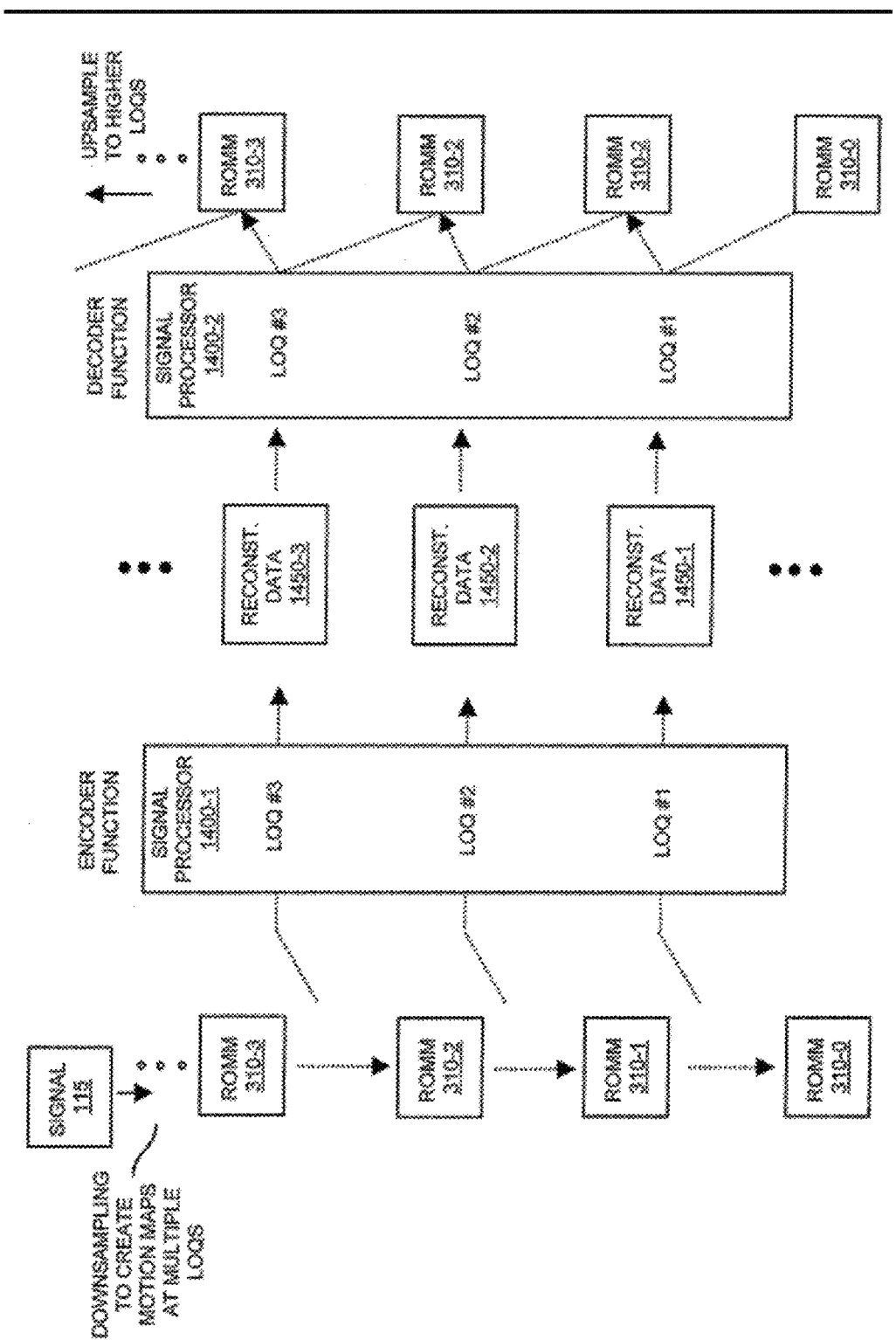
FIG. 14 is an example diagram illustrating an encoder function and decoder function according to embodiments herein.

FIG. 14 is an example diagram illustrating encoding and decoding according to embodiments herein.

In general, the system in FIG. 14 illustrates full-fledged application of the motion map resolution changer algorithm analogous to at least some of the system processing described in related U.S. patent application Ser. No. 13/188,207 entitled "SIGNAL PROCESSING AND TIERED SIGNAL ENCODING," filed on Jul. 21, 2011, the entire teachings of which are incorporated herein by this reference.

More specifically, the encoder receives a dense motion map at the highest level of quality for the signal 115 such as an image. As mentioned, the dense motion map 310 at the highest level of quality can indicate relationships of elements in the signal (at the respective level of quality) to an element in another a reference image. After motion estimation (i.e., after receiving from somewhere an accurate dense motion map at high resolution), the encoder downsamples the dense motion map at the high level of quality using the motion map resolution changer algorithm as discussed herein. The encoder downsamples the motion map to the lowest level of quality (e.g., LOQ #1) in the hierarchy.

During the downsampling process, when downsampling rendition of motion map 310-3 to rendition of motion map 310-2, the encoder creates reconstruction data 1450-3. Reconstruction data 1450-3 can include information such as residual data indicating how to upsample the rendition of motion map 310-2 to rendition of motion map 310-3. As discussed in related applications, the residual data provides a way of refining settings of the motion maps during upsampling by the decoder.

In a similar manner, the encoder creates reconstruction data 1450-2 when downsampling rendition of motion map 310-2 to rendition of motion map 310-1. Again, reconstruction data 1450-2 can include information such as residual data indicating how to upsample the rendition of motion map 310-2 to rendition of motion map 310-1, and so on.

In one embodiment, the signal processor 1400-1 in the encoder simulates the decoder in order to generate the reconstruction data 1450 at the different levels of quality.

The decoder function (e.g., signal processor 1400-2) receives the rendition of motion map 310-0 at the lowest level of quality. The rendition of motion map 310-0 provides a baseline for creating the more detailed motion maps at the higher level of quality. For example, in one embodiment, the decoder function upsamples the rendition of motion map 310-0 using the motion map resolution changer algorithm as discussed herein. Additionally, the decoder receives reconstruction data 1450-1. The decoder uses the reconstruction data 1450-1 to tweak the settings of the upsampled motion map. As mentioned, the reconstruction data 1450-1 can include residual data to make adjustments in a similar manner as discussed in the related applications.

The decoder then upsamples the rendition of motion map 310-1 using the resolution changer algorithm as discussed herein. The rendition of motion map 310-1 provides a baseline for creating the more detailed motion maps at the next higher level of quality. For example, in one embodiment, the decoder function upsamples the rendition of motion map 310-1 using the motion map resolution changer algorithm as discussed herein. After this upsampling, the decoder utilizes reconstruction data 1450-2 to tweak or adjust one or more settings of the elements in upsampled motion map. The signal processor 1400-2 (e.g., decoder function) repeats this process at each level of quality to reproduce the rendition of the motion map at the highest level of quality. In other words, the decoder reproduces the rendition of the dense motion map.

In one embodiment, the decoder function leverages the settings in the dense motion map to reduce the amount of data that is needed to reconstruct the original signal. For example, the motion map (e.g., auxiliary map) can include motion vector information indicating settings of elements in a reference image to use as a basis for settings of elements in the current image being reproduced.

Note further that the processing as discussed with respect to FIG. 14 also can include techniques in related U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference. For example, it is possible to specify, via residual data, when there will be no residual data for the child elements at the higher levels of quality, potentially up to the highest level, for a given element and for all of its sub-elements. In such an instance, reconstruction data will just inherit zero adjustment values for that area (e.g., parent element, and child elements) of the image, which means that for those elements and from that level upwards, what we obtain with the upsampling operations will not be adjusted.

Figure 15:
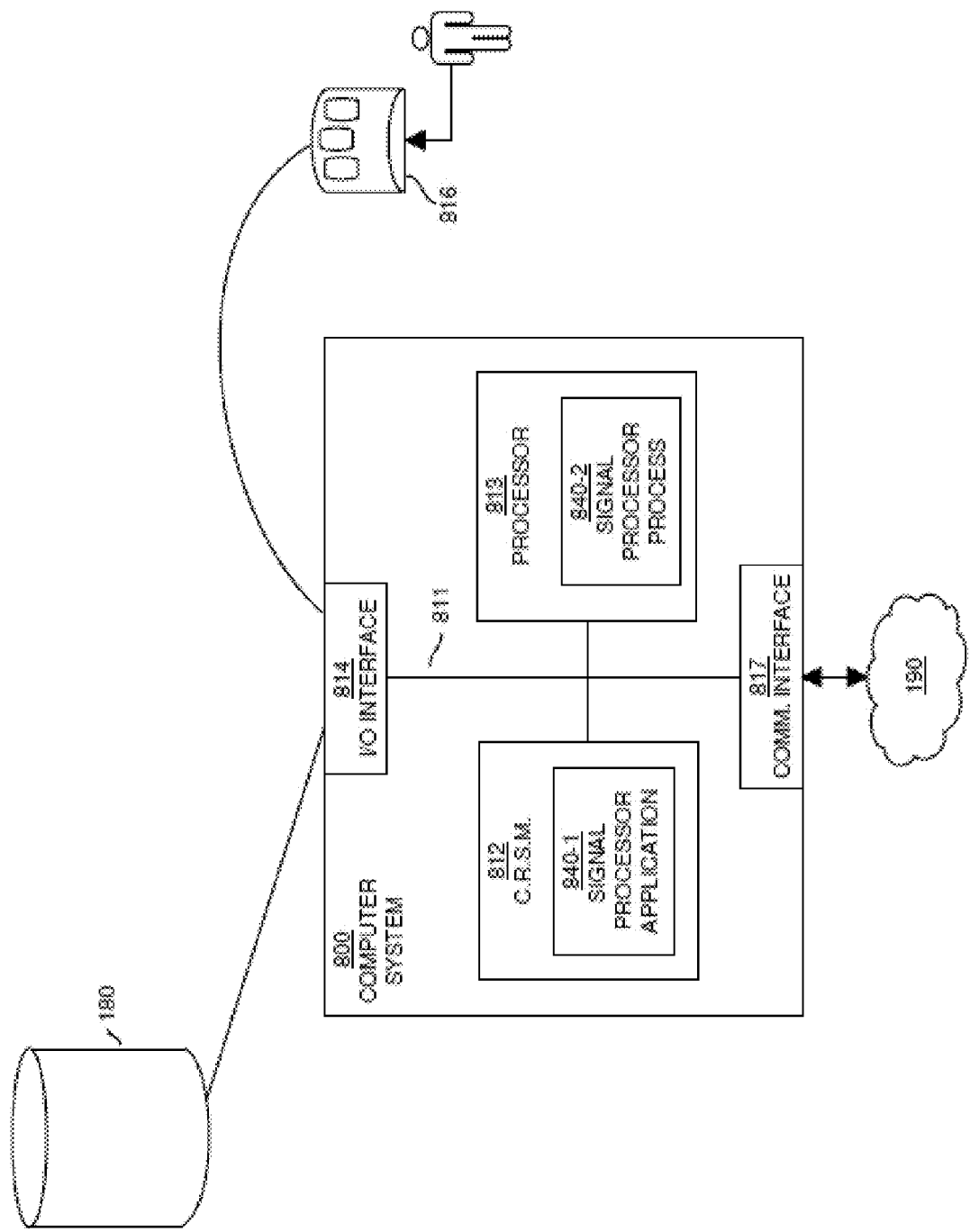
FIG. 15 is a diagram illustrating an example computer architecture for executing computer code, firmware, software, applications, logic, methods, etc., according to embodiments herein.

FIG. 15 is an example block diagram of a computer system 800 that provides computer processing according to embodiments herein.

Computer system 800 can be or include a computerized device such as a personal computer, processing circuitry, television, playback device, encoding device, workstation, portable computing device, console, network terminal, processing device, network device, operating as a switch, router, server, client, etc.

Note that the following discussion provides a basic embodiment indicating how to carry out functionality associated with signal processor 1400 as previously discussed. However, it should be noted that the actual configuration for carrying out the operations as described herein can vary depending on a respective application.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with signal processor 1400. The instructions are executed by a respective resource such as signal processor 1400 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with signal processor application 140-1 executed by processor 813 as signal processor process 840-2.

Note that the computer system 800 or encoder 140 also can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with signal processor application 840-1 can support processing functionality as discussed herein. As mentioned, signal processor 1400 can be configured to support encoding and/or decoding.

During operation of one embodiment, processor 813 accesses computer readable storage media 812 via the use of interconnect 811 in order to launch, run, execute, interpret or otherwise perform the instructions of signal processor application 840-1 stored in computer readable storage medium 812. Execution of the signal processor application 840-1 produces processing functionality in processor 813. In other words, the encoder process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system that controls allocation and use of hardware processing resources to execute signal processor application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Note again that techniques herein are well suited for use in producing and processing motion vectors and motion maps. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. An image processing method of generating a signal encoded at multiple different levels of quality within a hierarchy, the image processing method comprising:
    selecting an element from a rendition of an auxiliary map at a first level of quality in the hierarchy;
    subdividing the selected element in the auxiliary map at the first level of quality into multiple sub-elements of an auxiliary map at a second level of quality in the hierarchy, the second level of quality higher than the first level of quality; and
    based at least in part on auxiliary information assigned to at least one element in the auxiliary map at the first level of quality, generating in the auxiliary map at the second level of quality respective auxiliary information for each of the sub-elements at the second level of quality, the auxiliary information in the auxiliary map at the second level of quality for each of the sub-elements specifying motion at a higher resolution than a resolution of the sub-elements in the auxiliary map at the second level of quality.

2. The method as in claim 1 further comprising:
    selecting multiple elements from a rendition of the auxiliary map at the first level of quality;
    aggregating the multiple elements at the first level of quality into a parent element, the parent element being at a third level of quality in the hierarchy for the auxiliary map, the third level of quality lower than the first level of quality; and
    based at least in part on auxiliary information assigned to at least one element in the auxiliary map at the first level of quality, generating respective auxiliary information for the parent element at the third level of quality of the auxiliary map.

3. The method as in claim 1, wherein the auxiliary map at the second level of quality is also an auxiliary map with respect to the signal at the second level of quality, the method further comprising:

creating a hierarchy of auxiliary maps at multiple different levels of quality, each auxiliary map including auxiliary information for the signal at a corresponding level of quality.

4. The method as in claim 3, wherein the auxiliary information supports a process of reconstructing the signal based on reference image information at a respective level of quality.

5. The method as in claim 1, wherein the auxiliary map is a motion map including motion vectors, the motion vectors indicating a relationship from one element to another.

6. The method as in claim 5, wherein motion vector coordinates are expressed using a polar coordinate system.

7. The method as in claim 1, wherein the auxiliary map is a z-map; and wherein the auxiliary information includes auxiliary elements indicating a depth of elements of the signal to which the auxiliary map refers at a corresponding level of quality.

8. The method as in claim 1, wherein the auxiliary map is a class map and auxiliary elements include information related to a class assigned to each element of the signal to which the auxiliary map pertains.

9. The method as in claim 1, wherein the auxiliary information associated to each plane element of the auxiliary map includes, along with auxiliary vectors, meta-information relative to the contents of auxiliary vectors; and the meta-information associated to each plane element of the auxiliary map includes statistical information with respect to the auxiliary vectors.

10. The method as in claim 1 further comprising:
identifying a signal element corresponding to a given element in the auxiliary map;
identifying a set of elements in the signal at the first level of quality that are contiguous with the identified signal element at the first level of quality;
analyzing auxiliary vectors associated with the identified set of signal elements; and
generating a respective auxiliary vector for a particular sub-element at the second level of quality in the auxiliary map depending on auxiliary vectors associated with the identified set of elements.

11. The method as in claim 10, wherein the respective auxiliary vector at the second level of quality is obtained by applying a linear filter to the auxiliary vectors associated with the identified set of elements at the first level of quality.

12. The method as in claim 1, wherein responsive to detecting that a majority of elements at the first level of quality bordering a particular sub-element of a given element at the first level of quality are assigned a respective auxiliary vector value within a range, assigning a calculated auxiliary vector value to a particular sub-element of the multiple sub-elements, the calculated auxiliary vector value derived from a weighted average of the values of auxiliary vectors of neighboring elements, weights of which depend on a similarity of each auxiliary vector with respect to the respective auxiliary vector.

13. The method as in claim 1 further comprising:
producing the auxiliary map based at least in part on settings information of a current image in the signal, the auxiliary map pertaining to the current image.

14. The method as in claim 1 further comprising:
producing the auxiliary map based at least in part on settings information of a reference image in the signal, the auxiliary map pertaining to a current image in the signal that is derived at least in part based on the reference image.

15. The method as in claim 1, wherein leveraging settings information includes:
identifying color information for sub-elements in a reference image at the second level of quality based on at least one auxiliary vector associated with the selected element at the first level of quality;
utilizing the color information to generate respective auxiliary vectors for the sub-elements, values of the respective auxiliary vectors following color transitions as indicated by the color information.

16. The method as in claim 1 further comprising:
generating the auxiliary map at the first level of quality by applying, to the contents of auxiliary vectors of the map at the first level of quality, a filter characterized by a kernel obtained by multiplying a linear kernel with a kernel based on image settings.

17. The method as in claim 16, wherein the linear kernel is a higher-order filter selected from a group consisting of: a bilinear filter, a bicubic filter, a Lanczos filter, a Mitchell-Netravali filter, and a Gaussian filter.

18. The method as in claim 1 further comprising:
applying, to the coordinates of auxiliary vectors of the auxiliary map at a first level of quality, a filter characterized by a kernel obtained by multiplying a non-linear kernel with a kernel that is a function of image settings.

19. The method in claim 1 further comprising:
generating auxiliary map based at least in part on meta-information associated with auxiliary vectors.

20. The method as in claim 19, wherein meta-information includes a parameter selected from the group consisting of:
precision of each auxiliary vector,
covariance information of each vector, and
quality of the vector.

21. The method as in claim 1 further comprising:
leveraging image setting information and meta-information to produce a rendition of the auxiliary map at a second level of quality by applying, to the auxiliary vectors of the map at a first level of quality, a filter whose kernel is obtained by multiplying a linear kernel with a kernel dependent on image settings and then with a kernel that is a function of auxiliary vector meta-information.

22. The method as in claim 1 further comprising:
calculating meta-information for the auxiliary vectors of the auxiliary map at a third level of quality by filtering meta-information of the auxiliary map a lower level of quality leveraging a kernel that is a function of the kernel used to produce auxiliary vector information.

23. The method as in claim 1 further comprising:
refining the auxiliary map via upsampling and generating a hierarchy of motion maps.

24. The method as in claim 1 further comprising:
decoding an auxiliary map, the decoding including:
using steps recited in claim 1 to upsample an auxiliary map, adding reconstruction data after each upsample operation to reconstruct a rendition of the auxiliary map at the higher level of quality.

25. The method as in claim 24 wherein:
the auxiliary map is a motion map.

26. The method as in claim 1 further comprising:

decoding the auxiliary map in accordance with a multi-level tier-based decoding protocol.

27. The method as in claim 1 further comprising:

selecting a sub-element from the multiple sub-elements in the auxiliary map at the second level of quality;

subdividing the selected sub-element into multiple sub-sub elements in an auxiliary map at a third level of quality in the hierarchy, the third level of quality higher than the second level of quality; and based at least in part on auxiliary information assigned to sub-elements in the auxiliary map at the second level of quality, generating in the auxiliary map at the third level of quality respective auxiliary information for each of the sub-sub elements at the third level of quality, the auxiliary information in the auxiliary map at the third level of quality for each of the sub-sub-elements specifying motion at a higher resolution than a resolution of the sub-sub-elements in the auxiliary map at the third level of quality.

28. The method as in claim 27, wherein the auxiliary information for each of the sub-elements in the auxiliary map of the second level of quality includes a respective motion vector.

29. The method as in claim 28, wherein the auxiliary information for each of the sub-sub-elements in the auxiliary map at the third level of quality includes a respective motion vector.

30. The method as in claim 1 further comprising:

downsampling a motion map associated with the signal to produce the auxiliary map at the first level of quality.

31. The method as in claim 30 further comprising:

producing residual data associated with the auxiliary maps at the different levels of quality, the residual data providing a way of refining settings of motion vectors in the auxiliary maps during upsampling by a decoder.

32. Computer-readable storage hardware having instructions stored thereon, the instructions, when carried out by an image processing device, causes the image processing device to perform operations of:

selecting an element from a rendition of an auxiliary map at a first level of quality in a hierarchy;

subdividing the selected element in the auxiliary map at the first level of quality into multiple sub-elements of an auxiliary map at a second level of quality in the hierarchy, the second level of quality higher than the first level of quality; and based at least in part on auxiliary information assigned to at least one element in the auxiliary map at the first level of quality, generating in the auxiliary map at the second level of quality respective auxiliary information for each of the sub-elements at the second level of quality, the auxiliary information in the auxiliary map at the second level of quality for each of the sub-elements at a higher resolution than a resolution of the sub-elements specifying motion in the auxiliary map at the second level of quality.

\* \* \* \* \*